United States Patent [19]

Isoyama et al.

[11] Patent Number: 6,037,575
[45] Date of Patent: Mar. 14, 2000

[54] METHOD AND APPARATUS FOR REMOVING A DEFECT IN JOINED METAL BLOCKS

[75] Inventors: Shigeru Isoyama; Takeshi Hirabayashi; Hideyuki Nikaido; Hirosuke Yamada; Toshiaki Amagasa; Toshisada Takechi, all of Chiba; Kunio Miyamoto, Hiroshima; Akio Kuroda, Hiroshima; Yoshiki Mito, Hiroshima, all of Japan

[73] Assignees: Kawasaki Steel Corporation Chiba Works, Chiba; Mitsubishi Jukogyo Kabushiki Kaisha Hiroshima Machinery Works, Hiroshima, both of Japan

[21] Appl. No.: 08/946,756

[22] Filed: Oct. 7, 1997

Related U.S. Application Data

[62] Division of application No. 08/387,788, Feb. 15, 1995, Pat. No. 5,753,894.

[51] Int. Cl.[7] .................................................. B23K 13/01
[52] U.S. Cl. .............................................. 219/603; 72/203
[58] Field of Search .................................... 219/617, 603, 219/602, 614, 651, 659; 228/170, 151, 158, 235.2, 102; 72/203, 199

[56] References Cited

U.S. PATENT DOCUMENTS 5,323,951  6/1994  Takechi et al. .......................... 228/102

FOREIGN PATENT DOCUMENTS 52-76265   6/1977   Japan .
57-137008  8/1982   Japan .
60-244401  12/1985  Japan .
63-180457  7/1988   Japan .

Primary Examiner—John A. Jeffery
Assistant Examiner—Jeffrey Pwu
Attorney, Agent, or Firm—Dvorak & Orum

[57] ABSTRACT

A post continuous hot rolling method where a rear end portion of a preceding metal block and a fore end portion of a succeeding metal block are cut and the metal blocks joined to each other by heating and pressing followed by a finish rolling, wherein a poorly joined portion is removed by shaving the defective portion through application of rotating cutters prior to a final finish rolling of the joined blocks.

3 Claims, 35 Drawing Sheets

FIG_8
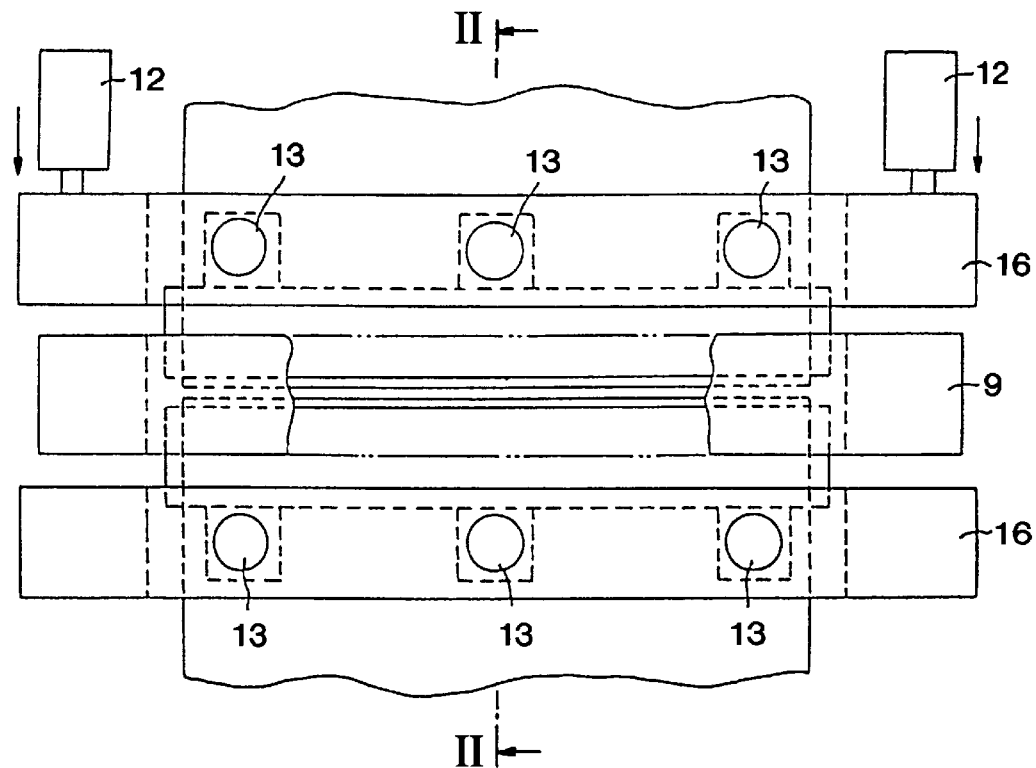
FIG_9
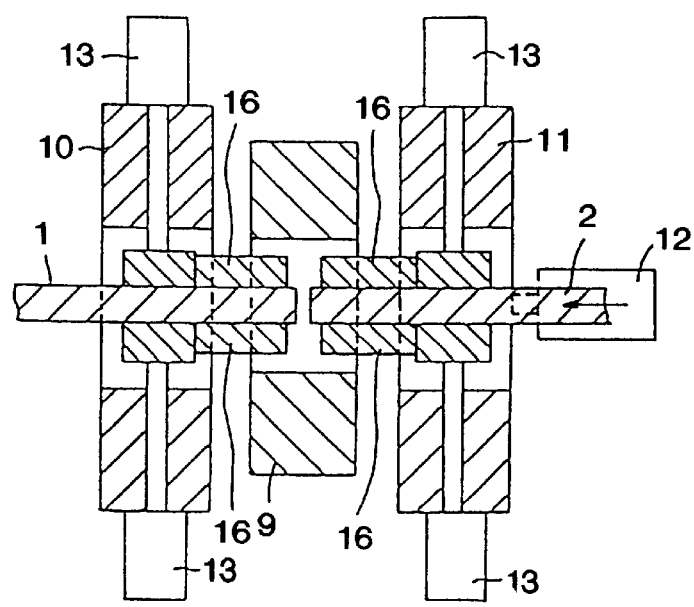

FIG_11A
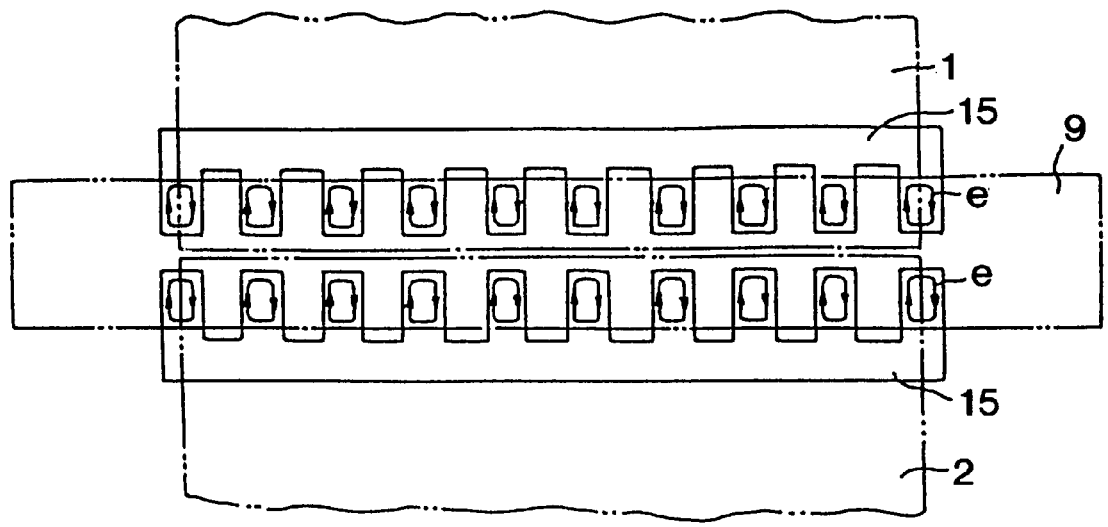
FIG_11B
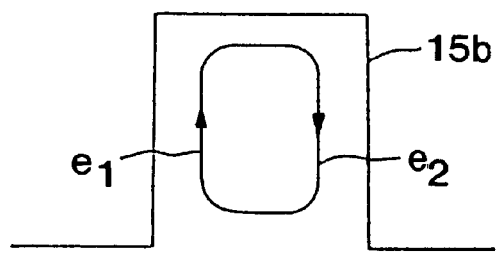
FIG_11C
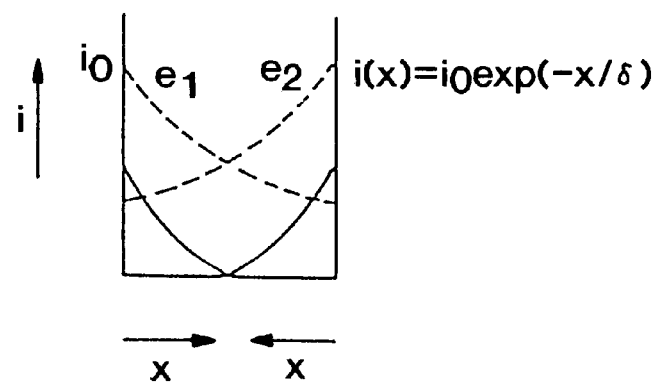

FIG_15A
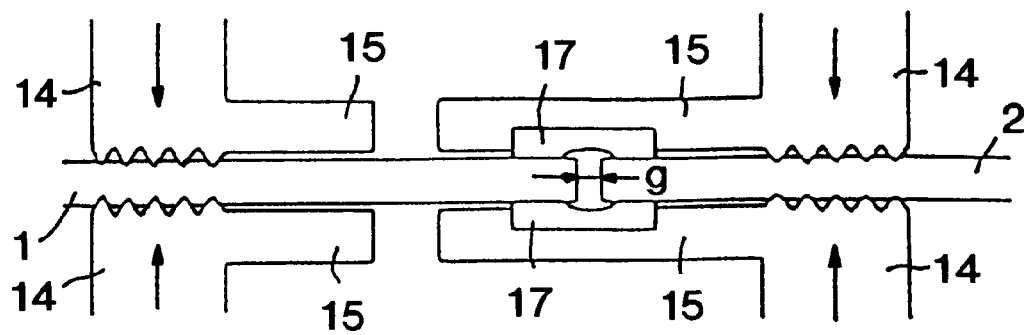
FIG_15B
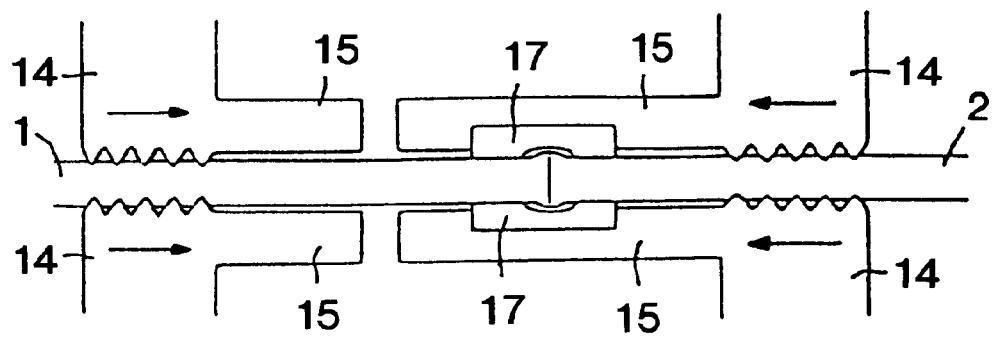
FIG_16
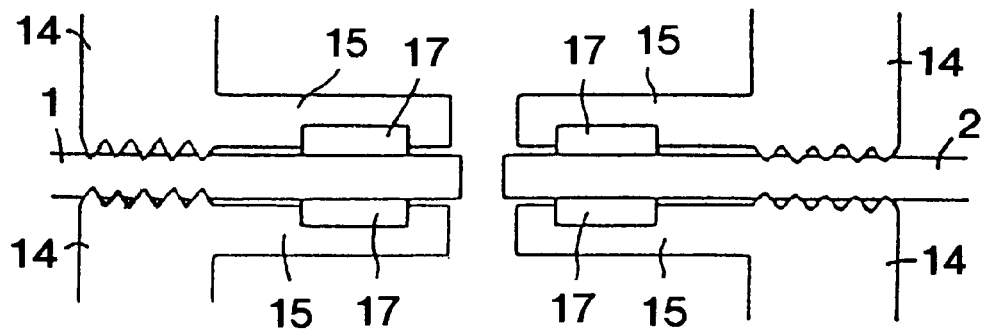

FIG_18
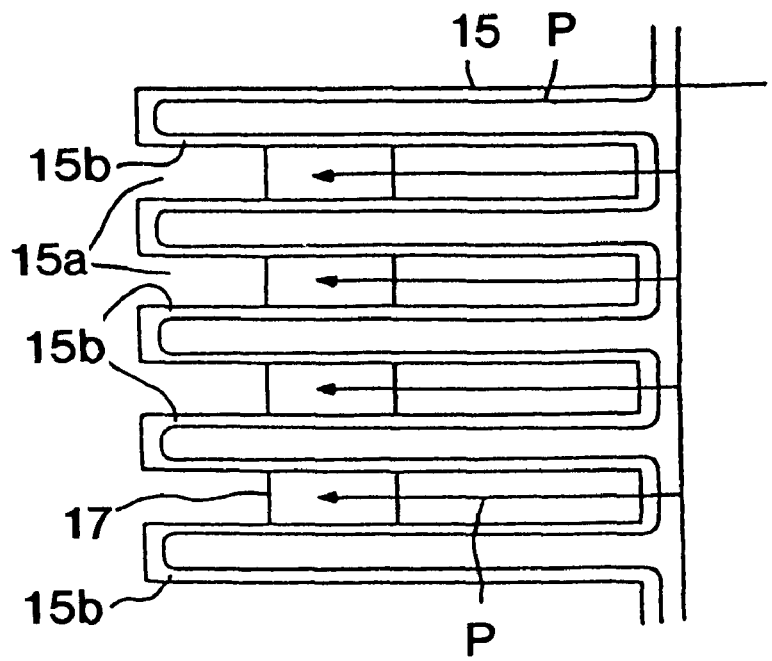
FIG_19
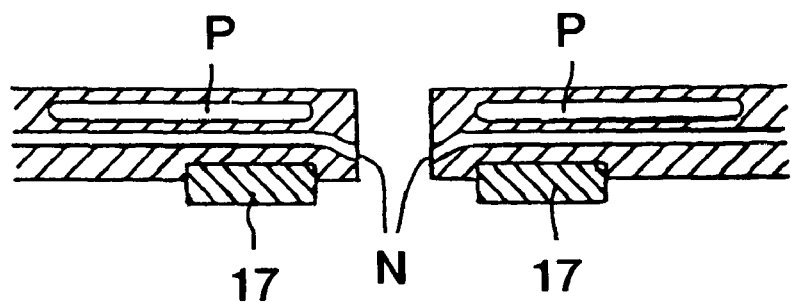

FIG_20
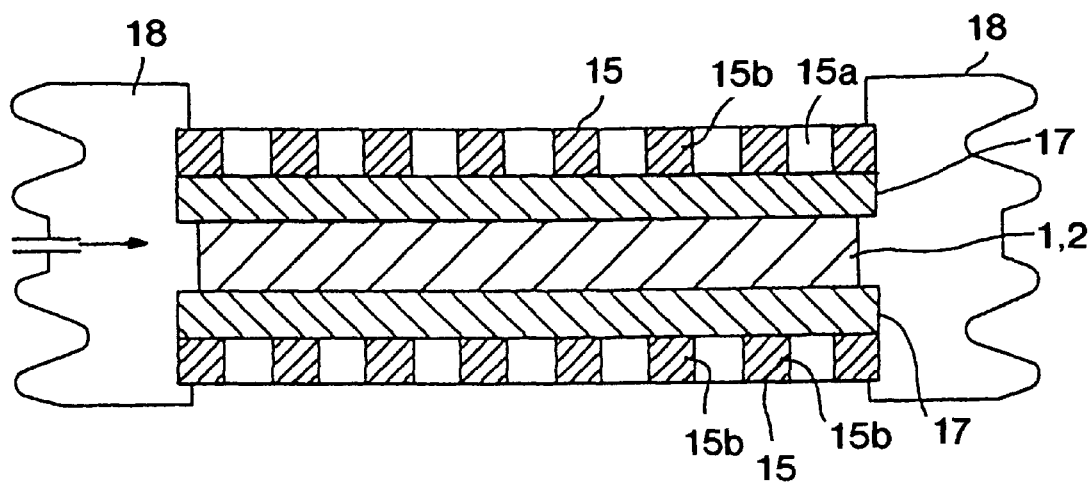
FIG_21
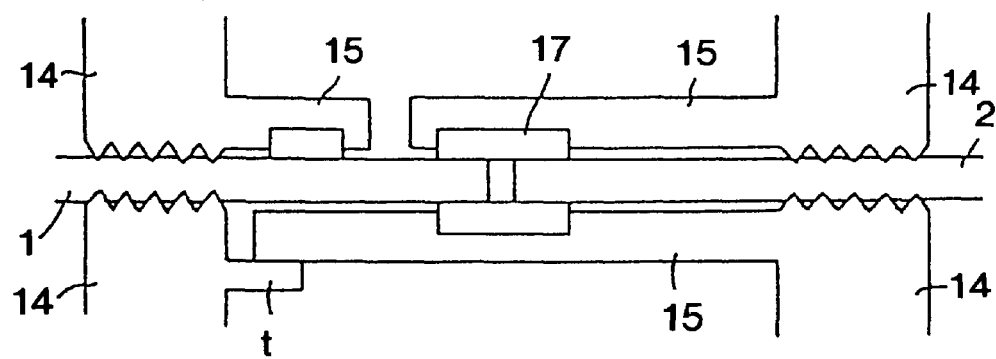

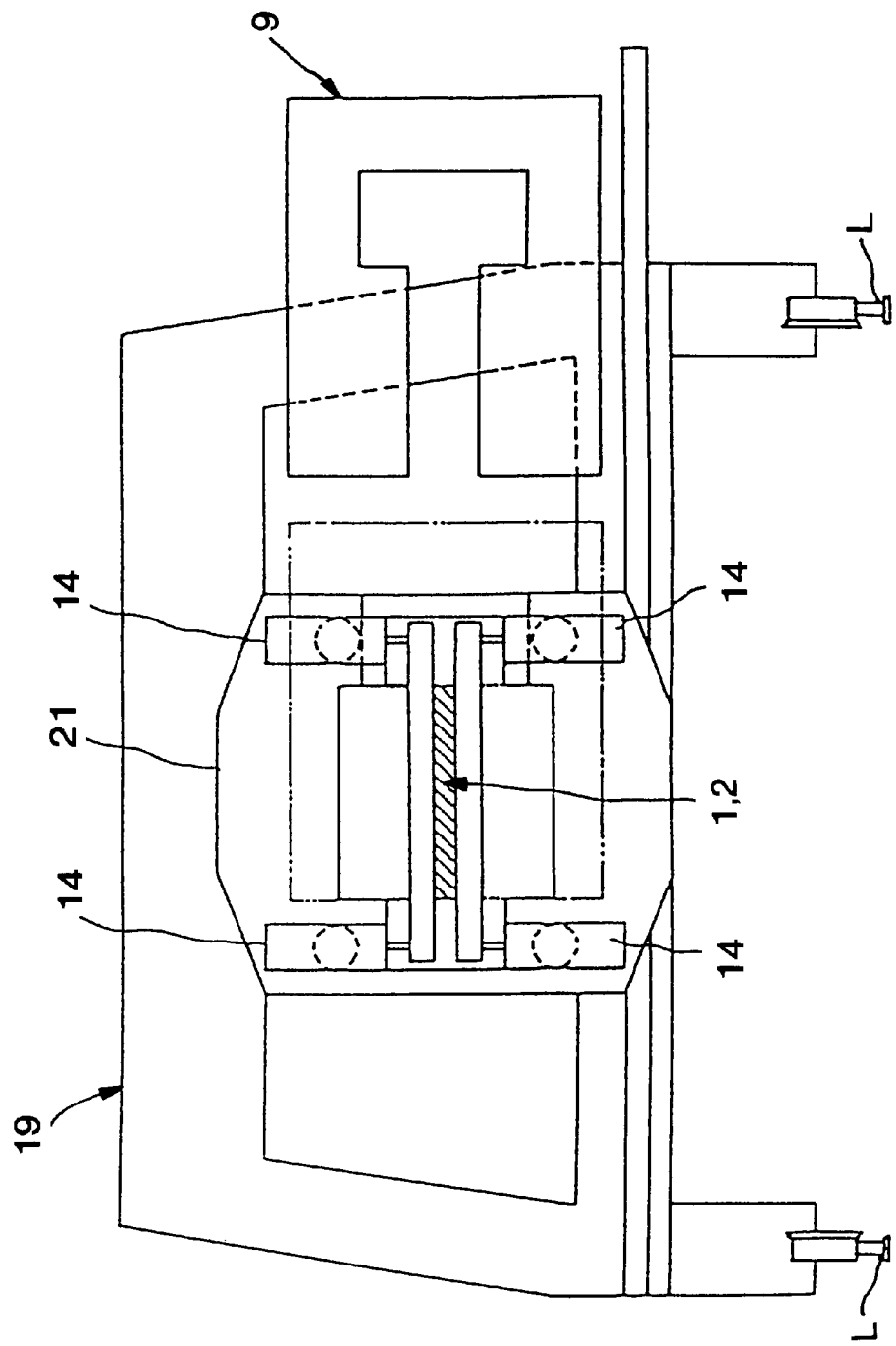

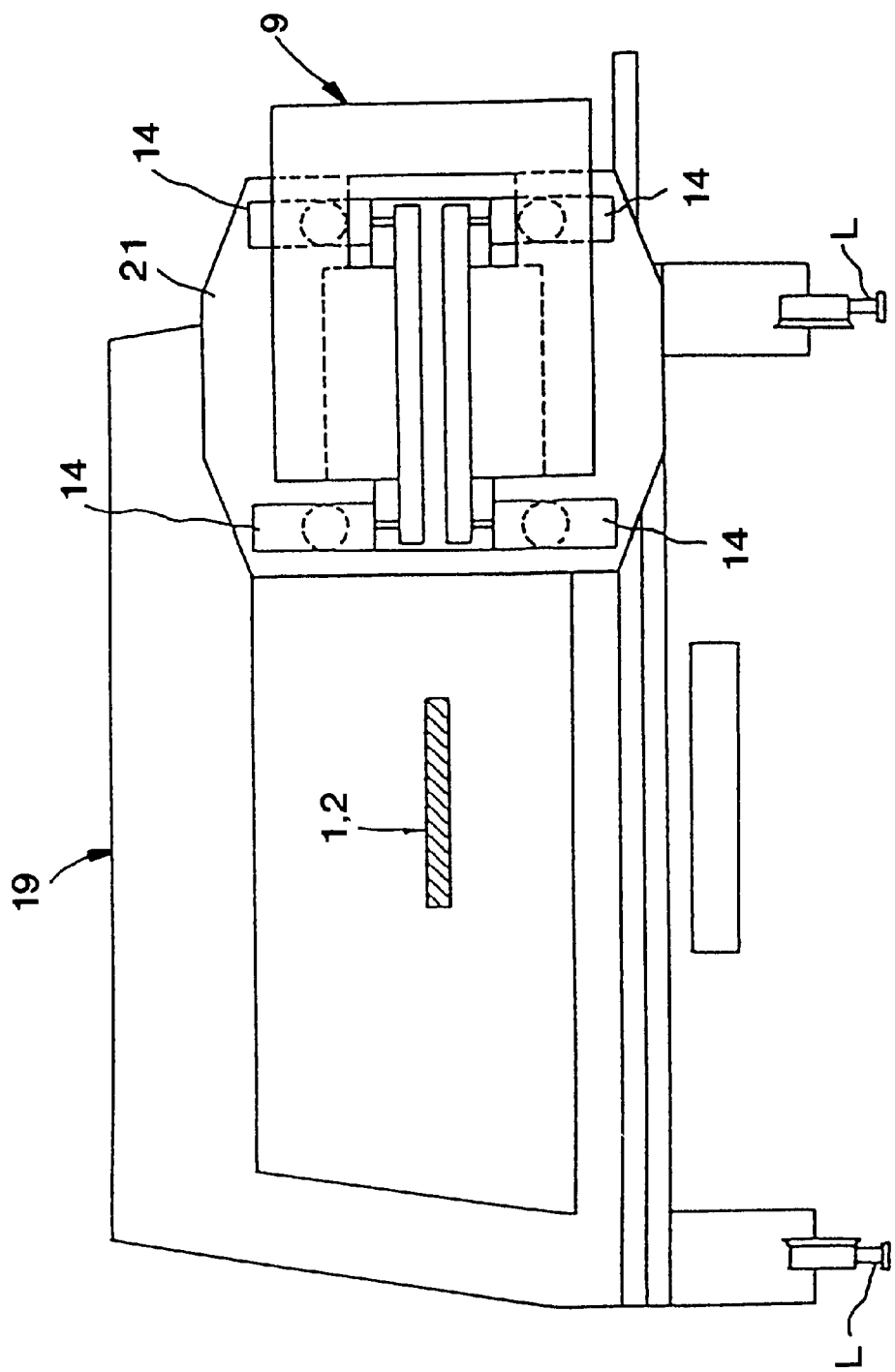

FIG_25
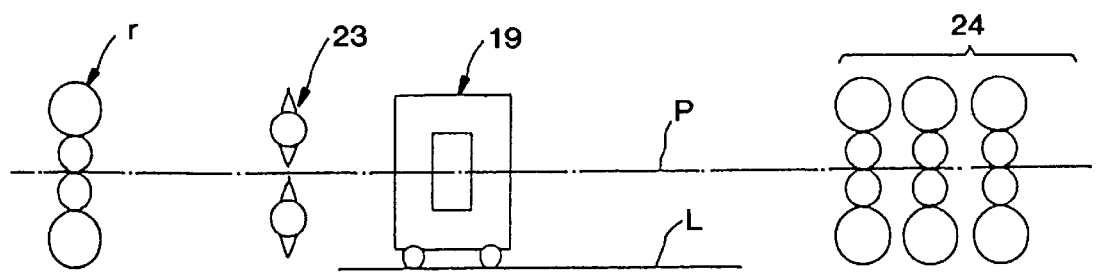
FIG_26
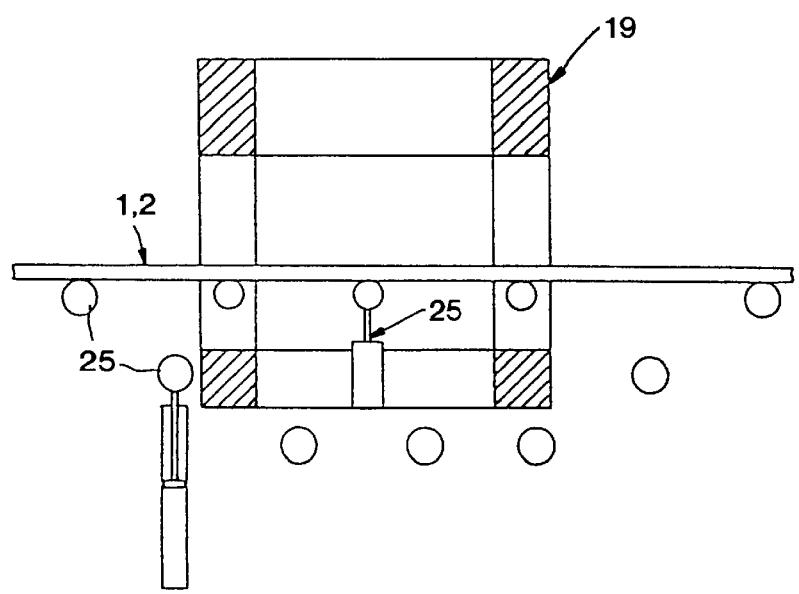

FIG_31

FIG_39
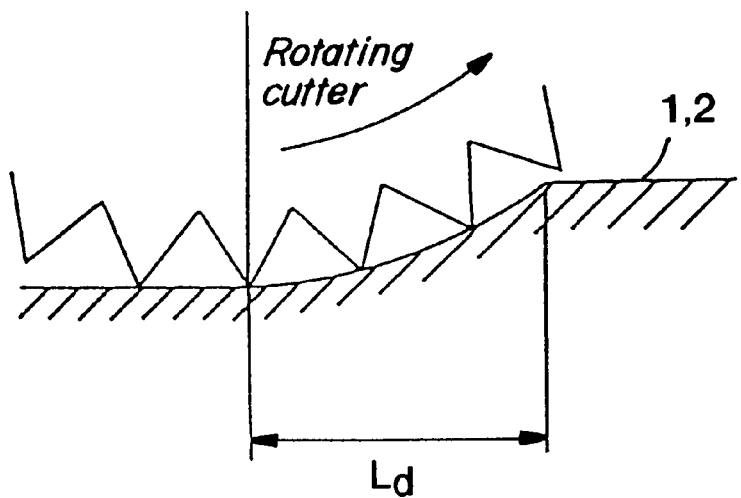
FIG_40
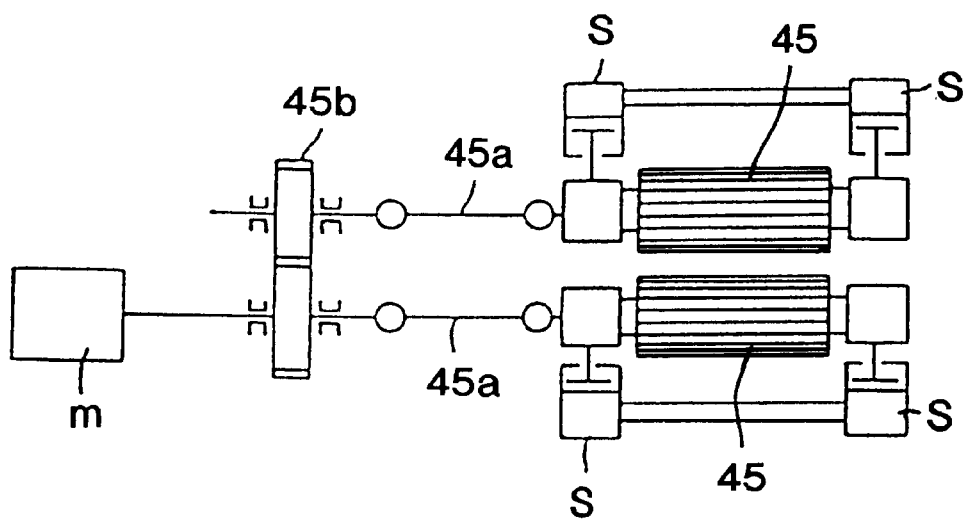

METHOD AND APPARATUS FOR REMOVING A DEFECT IN JOINED METAL BLOCKS

This is a division of application(s) Ser. No. 08/387,788 filed on Feb. 15, 1995, now U.S. Pat. No. 5,753,894.

TECHNICAL FIELD

The invention relates to a continuous hot rolling method of metal blocks for butt-joining a preceding metal block and a succeeding metal block and continuously performing a hot finish rolling, as well as a metal blocks joining apparatus, a table roller conveyor, a poor joined portion removing apparatus and a metal blocks cooling apparatus which are directly used to carry out such method.

BACKGROUND ART

Conventionally, in hot rolling lines of metal blocks comprised, for example, of steel, aluminum, copper and the like, the metal blocks to be rolled are heated, rough rolled and finish rolled one by one, so as to be finished into a plate having a predetermined thickness. Such a rolling system suffers from disadvantages that a poor threading of the rolled material in the finish rolling inevitably causes the line to stop, and a poor shape of fore end portion and rear end portion of the rolled material results in a low yield.

Therefore, it is a recent trend to carry out an endless rolling in which the metal blocks to be rolled are connected at the fore end and rear end portions thereof prior to the finish rolling and continuously conveyed to the hot rolling line. As prior art in this connection, various proposals are disclosed, for example, in Japanese Patent Application Laid-Open Nos. SHO-58-112601, SHO-60-244401, SHO-61-159285, SHO-61-144203, SHO-62-142082, SHO-62-234679, HEI-4-84609, HEI-4-89120, HEI-5-185109, etc.

According to a general practice, the regions of the metal blocks in the vicinity of their respective end portions are clamped and supported by clamps on the inlet side of the rolling equipment and the to-be-joined portion is heated to an elevated temperature and pressed and joined by heating means as the endless rolling of the metal blocks is performed. However, in joining the metal blocks which are passed through the abovementioned processes, there still remain various disadvantages such as those described below, in connection with which there have been demands for improvements.

(1) In butt-joining the metal blocks, it is necessary to precisely align the opposite end portions of the blocks and press them with each other. As shown in FIG. 1, the respective end portions of the preceding metal blocks 1 and the succeeding metal blocks 2 are applied with an alternating magnetic field in the direction of thickness, for example, by heating means 3 such as an induction heating coil. When such end portions are heated to an elevated temperature in a short time, even if the metal blocks are fixed and held by clamps, the end portions may shift vertically upon heating and pressing of the metal blocks. That is to say, the joined portion of the metal blocks reaches 1,300–1,500° C. in temperature and may be partly melted. Such melted portion has a decreased friction coefficient at the joining interface so that even a slight lack of uniformity in the pressing state may result in a vertical shifting of the plates. This may cause either formation of dissatisfactory joining as shown in FIG. 2 or occurrence of buckling. Thus, when the rolling is performed in such a condition, as shown in FIG. 3, the joined portion of the metal blocks may tilt down when it is bit into the rolls, and deformed and threaded into the base plate of the metal blocks, thereby giving rise to formation of excessively thin portions according to an increased number of rolling passage and a resultant breakage of the the plate during the rolling.

(2) The joining apparatus for joining the metal blocks is generally constructed such that a carriage movable on a conveying line of the metal blocks is provided with clamps for fixing the metal blocks, heating means (e.g., an induction heating coil) for heating the metal blocks to an elevated temperature, and pressing means for pressing the end portions of the metal blocks with each other. In this instance, it has been a general practice to cause the heating means to approach the metal blocks only in the use condition and maintain it off the line except during the heating, and such a practice proved to be free from problems. However, the clamps and the pressing means remain mounted on the carriage and hence located on the conveying line of the metal blocks, so that they are subjected to a substantial thermal load and their lives become relatively short. Moreover, the carriage mounting the clamps and the pressing means cannot be attached with table rollers for structural reasons, so that scratches are formed due to the sliding motion of the metal blocks in the carriage when scales are deposited thereon. Further, the maintenance of the clamps and the pressing means cannot be performed except when the transfer of the metal block is stopped or when the rolling is stopped.

(3) In the rolling line provided with a movable-type joining apparatus suitable for joining the metal blocks during the running, there is required an ascending and descending timing control with which the table rollers supporting the metal blocks are moved vertically corresponding to the running of the joining apparatus. A conventional table roller disclosed, for example, in Japanese Patent Application Laid-Open No. HEI-4-367303 lacks in accuracy and reliability as described below. Also, in connection with the driving cylinders for causing the vertical motion of the table rollers, it has been recognized disadvantageous that the hydraulic apparatus has to be large in scale due to a requirement for substantial flow rate of operating oil, thereby giving rise to substantial increase in the power loss and the running cost.

FIG. 4 shows a construction of the equipment disclosed in the abovementioned patent, and FIG. 5 shows a control mechanism relating to a vertical motion of the table rollers disposed in such equipment.

In FIG. 4 mentioned above, since the preceding metal block 1 and the succeeding metal block 2 are joined with each other while they are conveyed, the metal blocks joining apparatus 4 first assumes a waiting position on the upstream side (left side in FIG. 4) of the conveying line for the metal blocks. And, when the rear end portion of the preceding metal block 1 and the fore end portion of the succeeding metal block 2 reach to the joining apparatus 4, both metal blocks 1, 2 are clamped by pinch rolls $p_1$, $p_2$ disposed on the joining apparatus 4 while the joining apparatus 4 runs at the same speed as the conveying speed of the metal blocks, and the rear end portion of the preceding metal block 1 and the fore end portion of the succeeding metal block 2 are heated and pressed until the joining apparatus 4 reaches a predetermined position on the downstream side of the line to complete the joining. On this occasion, the control unit 5 shown in FIG. 5 detects the position of the joining apparatus 4 to operate driving cylinders 7a–7g through an electromagnetic valve 6, respectively, to cause vertical motion of the respective movable table rollers 8a–8g for preventing them from colliding against the joining apparatus 4. In the equipment constructed as above, there is required a control by which the table rollers positioned in front of the joining apparatus 4 are descended when the joining apparatus 4 reaches thereto and the table rollers are ascended immediately after the joining apparatus 4 has passed therethrough. However, there is a problem relating the accuracy and reliability of the electromagnetic valve 6 for performing the control and the vertical motions of the table rollers, so that the joining apparatus 4 and the table rollers 8a–8g may collide against each other. Also, in connection with the driving cylinders 7a–7g for causing the vertical motion of the table rollers 8a–8g, it has been recognized disadvantageous that the hydraulic apparatus has to be large in scale due to a requirement for substantial flow rate of operating oil, and such apparatus has to be continuously operated thereby giving rise to substantial increase in the power loss and the running cost.

(4) In the pressing process of the metal blocks, the butted portions are protruded with a protruding height of 10–25% of the base plate thickness, which is variable depending upon the pressing amount. Such protruding portion is referred to as a "poor joined portion" hereinafter, including burrs and the like. This may be influential on the pressing force of the rolling mill and the tension of the plate, such that the plate may be broken during rolling, either the rolling mills tend to be injured or the uniformity of the plate thickness tends to become poor as the poor joined portion is bit into the rolls, and fallen foils are likely to be formed.

In this connection, there has been proposed a pressing method in which the poor joined portion is sandwiched and crushed in the upward and downward directions or a press-cutting method using a cutter (Japanese Patent Application Laid-Open No. SHO-63-160707). Since, however, the poor joined portion is extended in the fallen foil manner by the pressing method, particularly when thin plates are rolled, the plate may be broken from such extended portion during rolling.

On the other hand, in the press-cutting method using a cutter, it is difficult to coincide the position of the cutter to the poor joined portion during running and the life of the cutters is short due to an increased cutting resistance. When, furthermore, the preceding metal block and the succeeding metal block are out of alignment relative to each other as the metal blocks are joined, the cutter may be caught by the non-aligned portion with the result that the plate is broken or the cutter is injured. Therefore, not only the cost for the cutter increases, but also there has been a limitation in connection with improvement in the manufacturing productivity.

Besides, as means for removing the poor joined portion, there have been known hot scarfing method and hot grinding method. However, both of them have been dissatisfactory to perform removal, within a short time of about 1 second, of a surface of the metal blocks at a temperature in excess of 1,000° C. or more, as in the continuous hot rolling aimed at by the invention.

DISCLOSURE OF THE INVENTION

It is an object to provide a novel method for dissolving all of the conventional various problems in connection with implementation of a continuous hot rolling, and various apparatuses which are used directly for carrying out said method.

The various problems described above as the tasks of the invention can be advantageously attained by the constituent features described below.

Specifically, the invention provides a continuous hot rolling method comprising the steps of cutting a rear end portion of a preceding metal block and a fore end portion of a succeeding metal block, respectively, heating and pressing the metal blocks to each other and thereby joining them with each other, and subsequently performing a finish rolling, wherein the method further comprises the step of restraining a region of each of the metal blocks extending from a clamping position to the end portion thereof for preventing a level change of the metal blocks upon heating and pressing the metal blocks (the first invention).

The invention further provides a continuous hot rolling method comprising the steps of cutting a rear end portion of a preceding metal block and a fore end portion of a succeeding metal block, respectively, heating and pressing the metal blocks to each other thereby joining them with each other, and subsequently performing a finish rolling, wherein the method further comprises the step of restraining a region of each of the metal blocks passed by a magnetic flux and extending from a clamping position to the end portion thereof, by means of a plurality of holding members, for preventing a level change of the metal blocks upon heating and pressing the metal blocks by an induction heating coil, said holding members being arranged spaced apart from each other on surfaces of the metal blocks and having a width which is not greater than five times of a penetration depth of an induced current by the heating coil (the second invention).

The invention further provides a continuous hot rolling method comprising cutting a rear end portion of a preceding metal block and a fore end portion of a succeeding metal block, respectively, heating and pressing the metal blocks to each other and thereby joining them with each other, and subsequently performing a finish rolling, wherein the method further comprises the step of arranging a plurality of holding members on a magnetic flux passing region of each of the metal blocks extending from a clamping position to the end portion thereof, for preventing a level change of the metal blocks upon heating and pressing the metal blocks by an induction heating coil, the holding members being arranged spaced apart from each other on surfaces of the metal blocks and each having a width which is not greater than five times of a penetration depth of an induced current by the heating coil, thereby restraining the metal blocks while maintaining an insulating state between the holding members and the metal blocks (the third invention). In this instance, it is preferable to perform the joining while blowing at least one of non-oxidizing gas and reducing gas onto a to-be-joined face and a joined portion of the metal block.

The invention further provides a continuous hot rolling method comprising cutting a rear end portion of a preceding metal block and a fore end portion of a succeeding metal block, respectively, heating and pressing the metal blocks to each other and thereby joining them with each other, and subsequently performing a finish rolling, wherein the method further comprises the step, upon joining the metal blocks by a movable joining apparatus, of escaping downwardly those table rollers for conveying the respective metal blocks, which are situated in a region below the movable joining apparatus, and returning the table rollers to an initial level in a conveying region of the respective metal blocks (the fourth invention).

The invention further provides a continuous hot rolling method comprising cutting a rear end portion of a preceding metal block and a fore end portion of a succeeding metal block, respectively, heating and pressing the metal blocks to each other and thereby joining them with each other, and subsequently performing a finish rolling, wherein the method further comprises the step of shaving off a poor joined portion from a surface of a base plate by a predetermined depth, upon removal of the poor joined portion of the metal blocks formed by pressing (the fifth invention). In this instance, it is preferable to control a rotating cutter upon shaving off the poor joined portion, such that a circumferential speed thereof is 50–120 m/s.

The invention further provides a continuous hot rolling method comprising cutting a rear end portion of a preceding metal block and a fore end portion of a succeeding metal block, respectively, heating and pressing the metal blocks to each other and thereby joining them with each other, and subsequently performing a finish rolling, wherein the method further comprises the step of cooling the joined portion after joining the metal blocks and before and/or after removing the poor joined portion (the sixth invention).

The invention further provides a metal block joining apparatus in a continuous hot rolling, which comprises heating means for heating the metal blocks to an elevated temperature, clamps having seizing portions which protrude toward the end portion of the metal block for clamping a preceding metal block and a succeeding metal block one above the other, and pressing means for moving and pressing at least one of the preceding metal block and the succeeding metal block toward the other of the metal blocks (the seventh invention).

The invention further provides a metal block joining apparatus in a continuous hot rolling, which comprises induction heating coil for heating the metal blocks to an elevated temperature, clamps for clamping and restraining a preceding metal block and a succeeding metal block one above the other, and pressing means for moving and pressing at least one of the preceding metal block and the succeeding metal block toward the other of the metal blocks, each of the clamps having a notch portion notched in a comb-like manner at regular intervals along a widthwise direction of the metal block in a magnet flux region of a seizing portion which protrudes form a clamping and supporting portion of the metal block toward an end portion thereof (the eighth invention).

The invention further provides a metal block joining apparatus in a continuous hot rolling, which comprises induction heating coils for heating the metal blocks to an elevated temperature, clamps for clamping and restraining a preceding metal block and a succeeding metal block one above the other, and pressing means for moving and pressing at least one of the preceding metal block and the succeeding metal block toward the other of the metal block, at least one of the clamps having a notch portion notched in comb-like manners at regular intervals in a widthwise direction of the metal block, and an insulation material bridged between the metal blocks in a region over both of the metal blocks (the ninth invention). In this instance, it is preferable to provide the clamp with a nozzle for blowing at least one kind of an non-oxidizing gas and a reducing gas onto a to-be-joined face and a joined portion of the metal blocks.

The invention further provides a metal block joining apparatus in a continuous hot rolling, which comprises heating means for metal blocks, clamps for clamping and restraining a preceding metal block and a succeeding metal block one above the other to thereby align levels of the metal blocks, and pressing means for moving and pressing at least one of the preceding metal block and the succeeding metal block toward the other of the metal blocks, moving means for moving each of said means between an on-line position and an off-line position, and vertically movable table rollers for supporting the metal block at a region where each of the means by the moving means have been moved to the off-line position (the tenth invention).

The invention further provides a metal block conveying table roller conveyor in a continuous hot rolling, which comprises a plurality of table rollers for supporting the metal blocks at a plurality of positions along a longitudinal direction thereof, cylinders arranged below and supporting the respective table rollers, and a hydraulic circuit including a hydraulic pipe which communicates cylinder heads with each other, for maintaining an inner pressure of each of the cylinder heads at a constant pressure (the eleventh invention).

The invention further provides a poor joined portion removing apparatus for metal blocks in a continuous hot rolling, which comprises a pair of upper and lower rotating cutters for cutting and removing a poor joined portions of the metal blocks, a rotating speed control means for controlling the rotating cutters at a circumferential speed of 50–120 m/s, tracking means for tracking a joined portion of the metal blocks, and a control means for controlling cutting by the rotating cutter according to a tracking state of the metal blocks (the twelfth invention).

The invention further provides a metal block cooling apparatus in a continuous hot rolling, which comprises a cooling nozzle for ejecting a cooling medium at one or more positions of a region which extends from an input side to an output side of a poor joined portion removing apparatus for removing a poor joined portion formed upon pressing the metal blocks (the thirteenth invention).

According to the invention, a region of the metal blocks extending from a position fixed by the clamps to the end portion thereof is restrained for preventing the end portion from deformation upon heating of the metal blocks to an elevated temperature, and thereby restricting a vertical movement thereof. It is thus possible to avoid joining of the metal blocks which have been dislocated relative to each other, and prevent occurrence of bucklings (the first to third inventions and the seventh to ninth inventions).

According to the invention, furthermore, the clamps, the heating means and the pressing means constituting the joining apparatus are individually movable so that it is possible to decrease the thermal load applied to such means and extend the life of the apparatus (the tenth invention).

According to the invention, furthermore, the table rollers for conveying the metal blocks are forced to escape to a position below the joining apparatus upon arrival thereof, and to return to the metal blocks conveying region immediately after passage of the joining apparatus. Therefore, a complicated control is not required in connection with the vertical motion of the table rollers for positively preventing collision of the table rollers against the joining apparatus, and it is possible to simplify the apparatus (the fourth and eleventh inventions).

According to the invention, furthermore, the poor joined portion formed by pressing the metal blocks is adapted to be shaved off from the surface of the base plate, thereby making it possible to realize a smooth rolling over the entire length of the metal blocks including the joined portion (the fifth and twelfth inventions).

According to the present invention, furthermore, when the poor joined portion formed by pressing the metal blocks are removed, the region of the metal blocks including the protruding portion and the joined portion is cooled during a period beginning from before initiation of the removal and lasting after completion of the removal. By carrying out the cooling before the removal of the poor joined portion, chips can be advantageously prevented from depositing onto the cutter thereby extending the cutter life. Moreover, by carrying out the cooling before and after the removal, it is possible to realize an improved uniformity in temperature of the base plate and the joined portion (the sixth and thirteenth inventions).

BRIEF DESCRIPTION OF THE DRAWINGS

FIG. 8 is a view showing the structure of the metal blocks joining apparatus.

FIG. 9 is a sectional view taken along the line II—II of FIG. 8.

FIGS. 11(a) and 11(b) are views showing states in which the metal blocks are heated when they are joined to each other.

FIGS. 15(a) and 15(b) are views showing states in which the metal blocks are joined to each other.

FIG. 16 is a view showing the structure of the joining apparatus according to another embodiment.

FIG. 18 is a view showing the structure of the joining apparatus according to another embodiment.

FIG. 19 is a view showing the structure of the joining apparatus according to another embodiment.

FIG. 20 is a view showing the structure of the joining apparatus according to another embodiment.

FIG. 21 is a view showing the structure of the joining apparatus according to another embodiment.

FIG. 23 is a sectional view taken along the line II—II of FIG. 22.

FIG. 24 is a sectional view taken along the line II—II of FIG. 22.

FIG. 25 is a view showing one embodiment of the continuous hot rolling equipment provided with the joining apparatuses shown in FIG. 22 to FIG. 24.

FIG. 26 is a view showing one example of use of the joining apparatus shown in FIG. 22.

FIG. 39 is a view showing the relationship between the edge and cutting arc length of the cutter.

FIG. 40 is a view explaining the structure of the poor joined portion removing apparatus.

BEST MODE FOR CARRYING OUT THE INVENTION

The invention will be explained in detail hereinafter with reference to the drawings.

Figure 1:
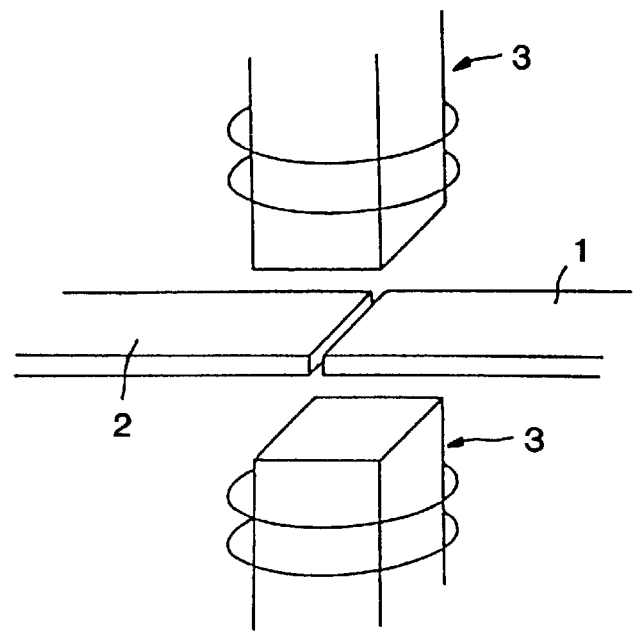
FIG. 1 is a view showing a state in which a preceding metal block and a succeeding metal block are heated to an elevated temperature by an induction heating coil.
Figure 2:
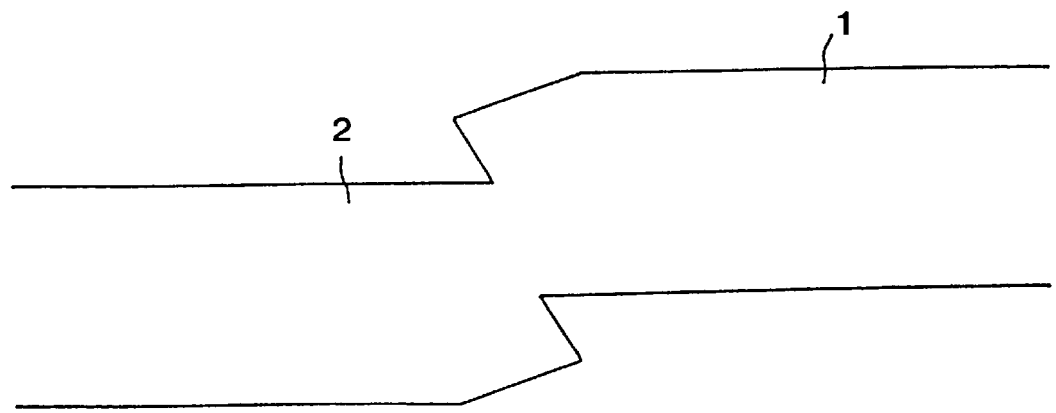
FIG. 2 is a view showing a state in which the preceding metal block and the succeeding metal block are joined.
Figure 3:
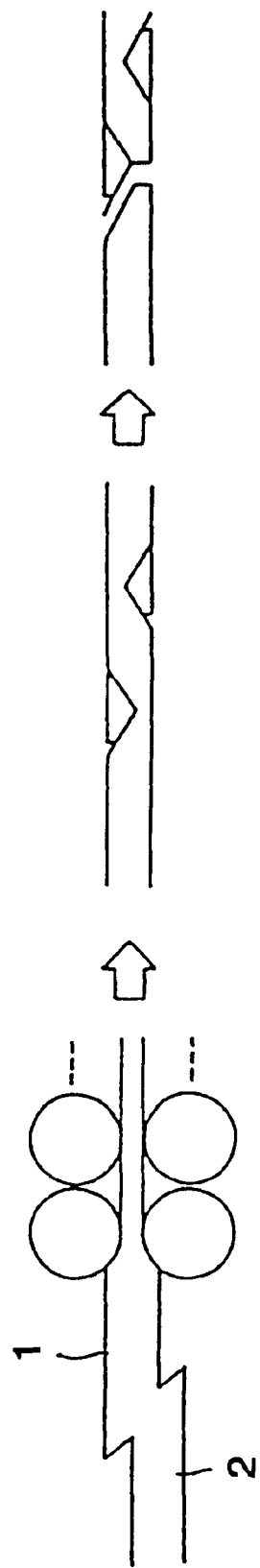
FIG. 3 is a view showing a state in which the joined metal blocks are broken during the hot rolling.
Figure 4:
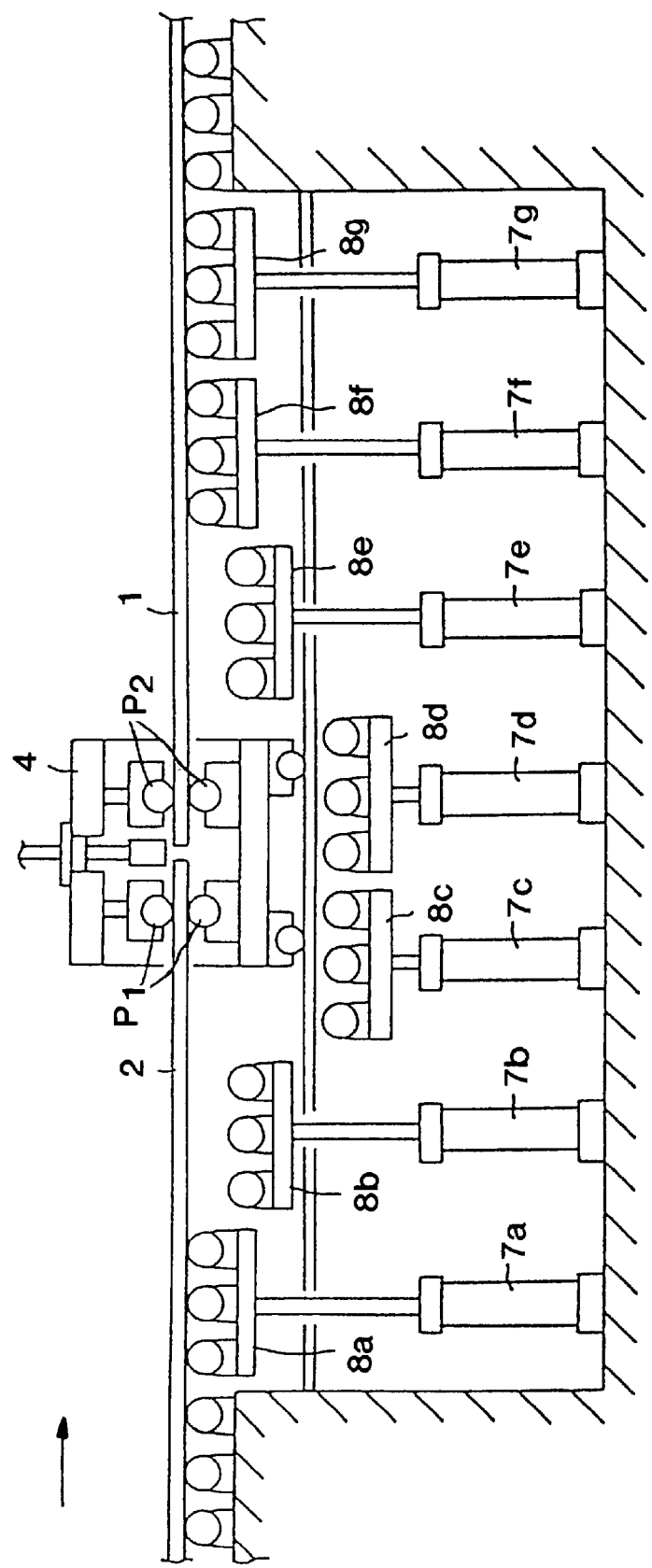
FIG. 4 is a view explaining the structure of a conventional table roller conveyor for conveying the metal blocks.
Figure 5:
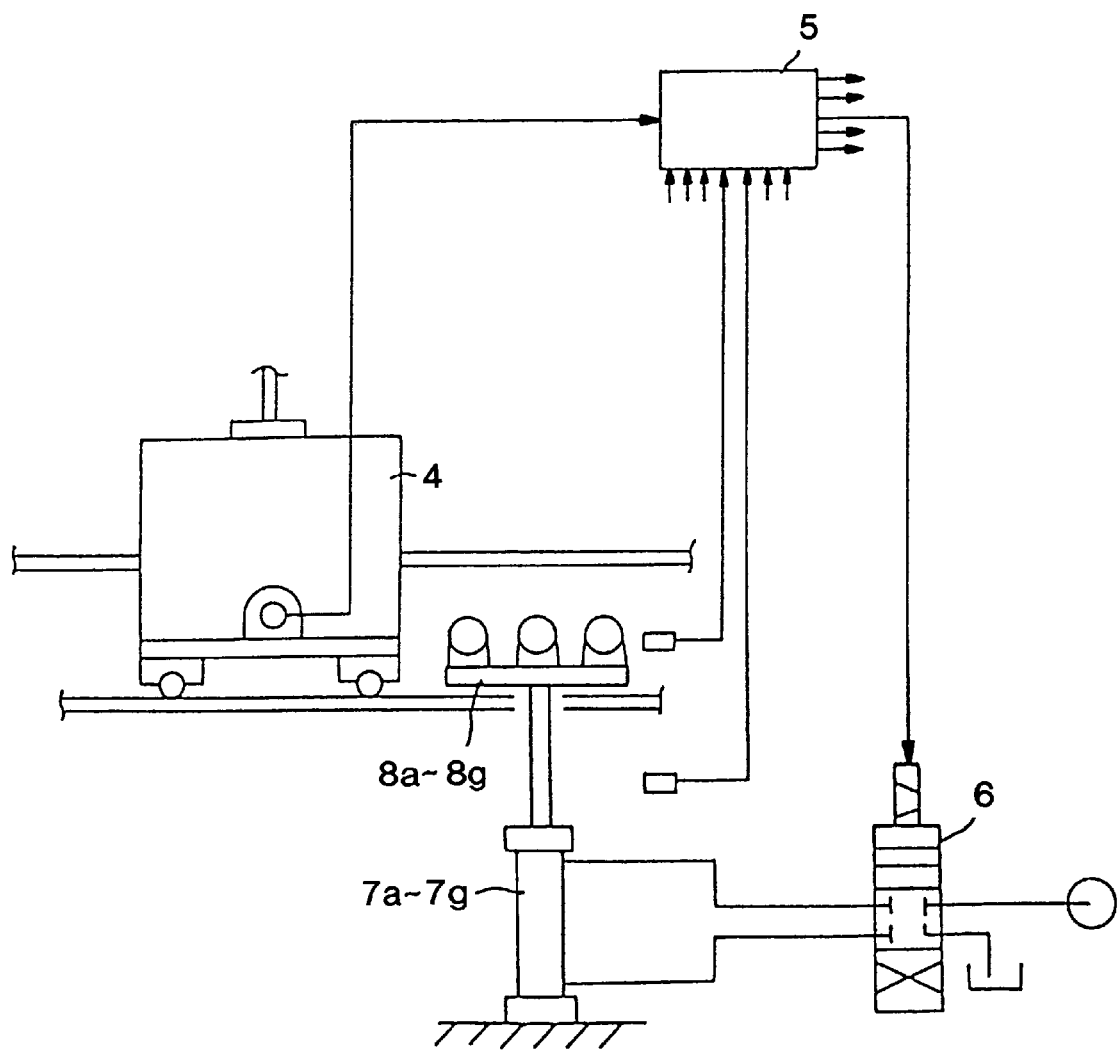
FIG. 5 is a view showing a mechanism for controlling the vertical motion of the table rollers shown in FIG. 4.
Figure 6:
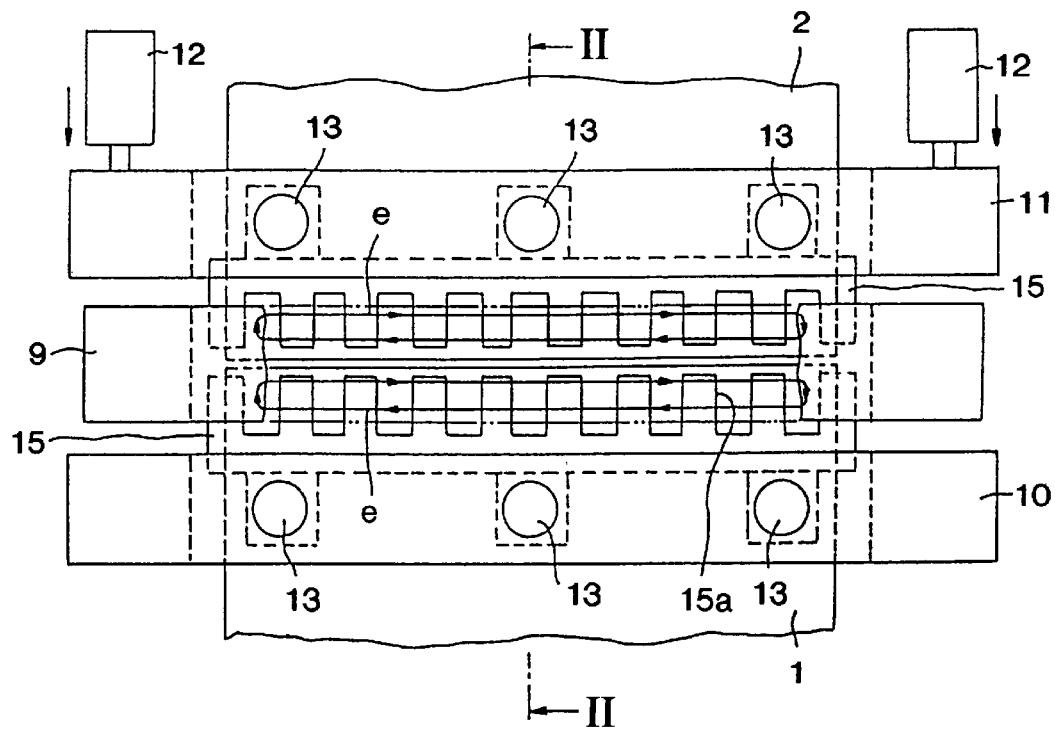
FIG. 6 is a view explaining the structure of the metal blocks joining apparatus.
Figure 7:
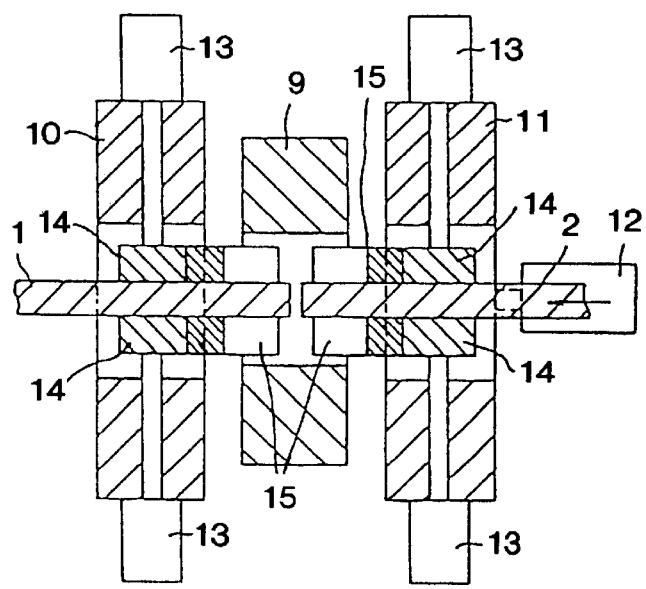
FIG. 7 is a sectional view taken along the line II—II of FIG. 6.

FIG. 6 shows the structure of the metal blocks joining apparatus, and FIG. 7 shows the sectional view taken along the line II—II of FIG. 6.

In FIG. 6 and FIG. 7, reference numeral 9 denotes an induction heating coil for heating an end portion of the metal block to an elevated temperature, which is arranged in such a manner that a preceding metal block 1 and a succeeding metal block 2 are passed through the center space portion thereof. Reference numeral 10 denotes an outlet frame which is arranged on the outlet side of the induction heating coil 9 in such a manner that the preceding metal block 1 and the succeeding metal block 2 can be passed through the center space portion thereof. Reference numeral 11 denotes an inlet frame which is provided with hydraulic cylinders 12 as means for pressing the metal blocks, and which is arranged on the inlet side of the heating means 9 in such a manner that the preceding metal block 1 and the succeeding metal block 2 can be passed through a center space portion thereof.

Hydraulic cylinders 13 are disposed on the upper portion and the lower portion of each of the inlet and outlet frames 10, 11 such that their respective rod portions extend therethrough. Each hydraulic cylinder 13 is provided at the leading end of the rod portion thereof with a clamp 14 for clamping an end portion of the metal block from above and below to thereby fixedly hold it.

Reference numeral 15 denotes a seizing portion for restraining a region extending from a position of the clamp 14 to the end portion of the metal block in order to prevent a level change, in the vertical direction, of the metal blocks upon pressing the metal blocks. The seizing portion 15 has a notch portion 15a notched in a comb-like manner at regular intervals along a widthwise direction of the metal block, and is mounted on each of the upper and lower clamps 14 which are attached to the leading ends of the rod portions of the hydraulic cylinders 13.

The preceding metal block 1 and the succeeding metal block 2 are arranged opposite to each other leaving a minute clearance therebetween, and pressed against each other with the clamp 14 and the seezing portion 15 by means of the hydraulic cylinders 12 so that they are restrained from above and blow. In this state, the preceding metal block 1 and the succeeding metal block 2 are applied with an alternate magnetic field by the induction heating coil 9 and thereby heated to an elevated temperature, and both of the metal blocks are pressed by operating the hydraulic cylinders 12, so that the metal blocks can be joined positively and in a short time without causing vertical dislocation and buckling of the metal blocks.

In this instance, a high frequency current is supplied to the induction heating coil 9 such that an alternating magnetic field is applied to the metal blocks to penetrate therethrough in the thickness direction and an induced current "e" is caused to flow on a plane of the metal blocks whereby they are heated to an elevated temperature in a short time.

The current density of the induced current "e" generated on such occasion has a distribution with reference to the end portion of the plate, which is represented by the following equation.

$$i(x) = i_0 \exp(-x/\delta)$$

x: the distance from the end portion of the plate
δ: the penetrating depth of the induced current $$\frac{1}{2\pi}\sqrt{(\rho \times 10^7)/(\mu \cdot f)}$$

f: frequency of the alternating magnetic field (Hz)
ρ: specific resistance (Ω•m)
μ: relative permeability (-)

Figure 10:
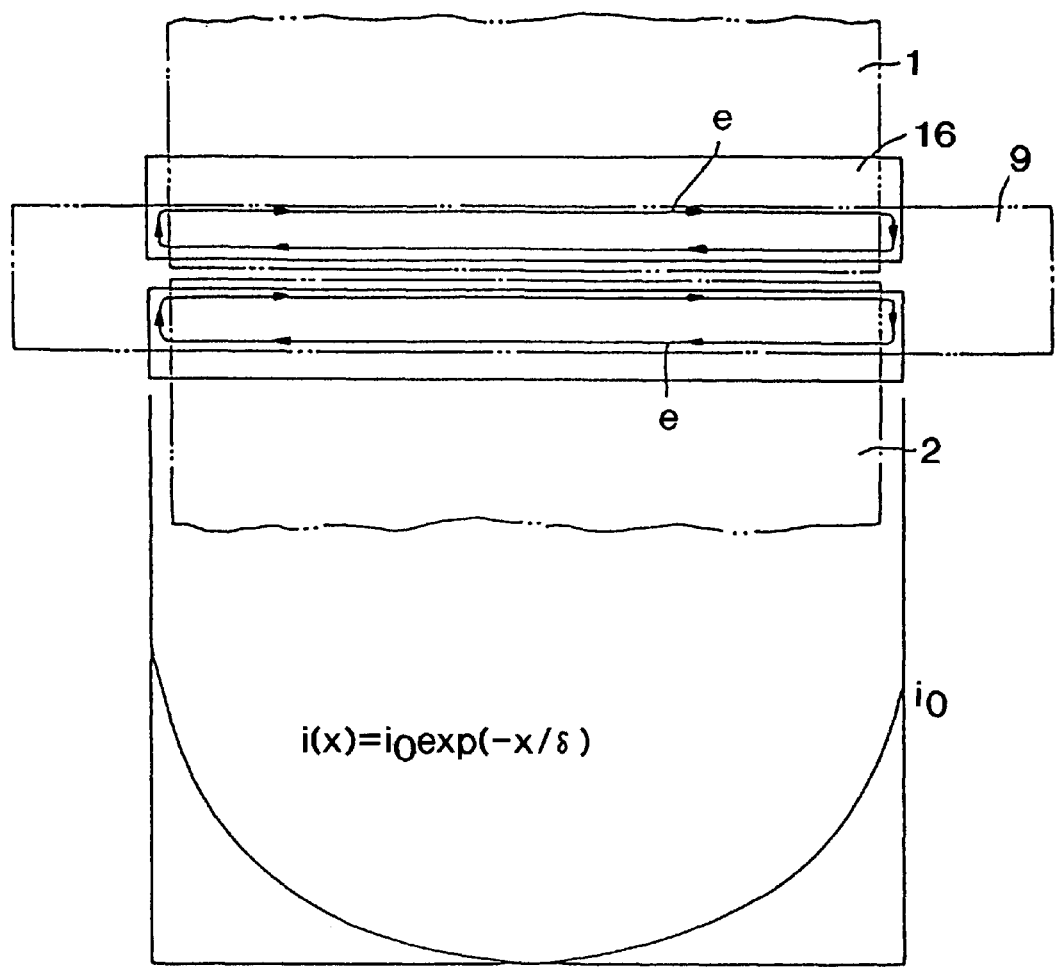
FIG. 10 is a view showing a state in which the metal blocks are heated when they are joined to each other.

When thus constructed joining apparatus is provided with a seizing portion 16 shown in FIG. 8 and FIG. 9 for restraining the metal block over the whole region in the widthwise direction thereof, instead of the seizing portion 15 of the clamp 14, a similar effect can be achieved. However, when the induction coil is used particularly as the heating means in the apparatus including such a seizing portion 16, the induced current "e" is caused to flow on the seizing portion 16 as shown in FIG. 10, so that the seizing portion 16 is heated to an elevated temperature together with the metal blocks 1, 2, thereby lowering the heating efficiency and causing the seizing portion 16 to be melted and welded to the metal blocks.

Therefore, in the joining apparatus provided with the clamps 14 having the seizing portion 16 shown in FIG. 8 and FIG. 9 mentioned above, it is preferable to incorporate a heating means using gas, torch, laser and the like is.

Upon heating the metal blocks, an induced current is caused to flow in the seizing portion 15 constructed as shown in FIG. 6 and FIG. 7 mentioned above. By forming notch portions 15a in a comb-like manner at regular intervals along the widthwise direction of the metal blocks, the induced current "e" in the comb teeth 15b becomes a circulating current, as shown in FIG. 11(a). Apparent induced currents $e_1$ and $e_2$ shown by dotted lines in FIG. 11(b), which illustrates a major part of the seizing portion 15, are opposite in direction to each other and interact to cancel each other. Thus, an actual current density is decreased as shown by the solid line, and generation of Joule's heat is reduced and the magnitude of heating becomes small. Therefore, the heating efficiency upon joining can be advantageously improved. In this connection, it should be noted that the induced current flows on the end surface of the metal block due to the skin effect. Moreover, melting of the seizing portion 15 and welding to the plate member are prevented.

It is desirable to make the width of each of the comb teeth 15b in the seizing portion 15 as the holding member within two times (but not zero) of the penetrating depth of the induced current, from the viewpoint of loss upon heating, though they are advantageously greater in width from the viewpoint of strength and rigidity. The width of the comb tooth 15b can be made upto about five times of the penetration depth, by performing cooling and the like. Of course, according to the invention, cooling may be performed in combination with the comb teeth whose width is not greater than two times of the penetrating depth.

Figure 12:
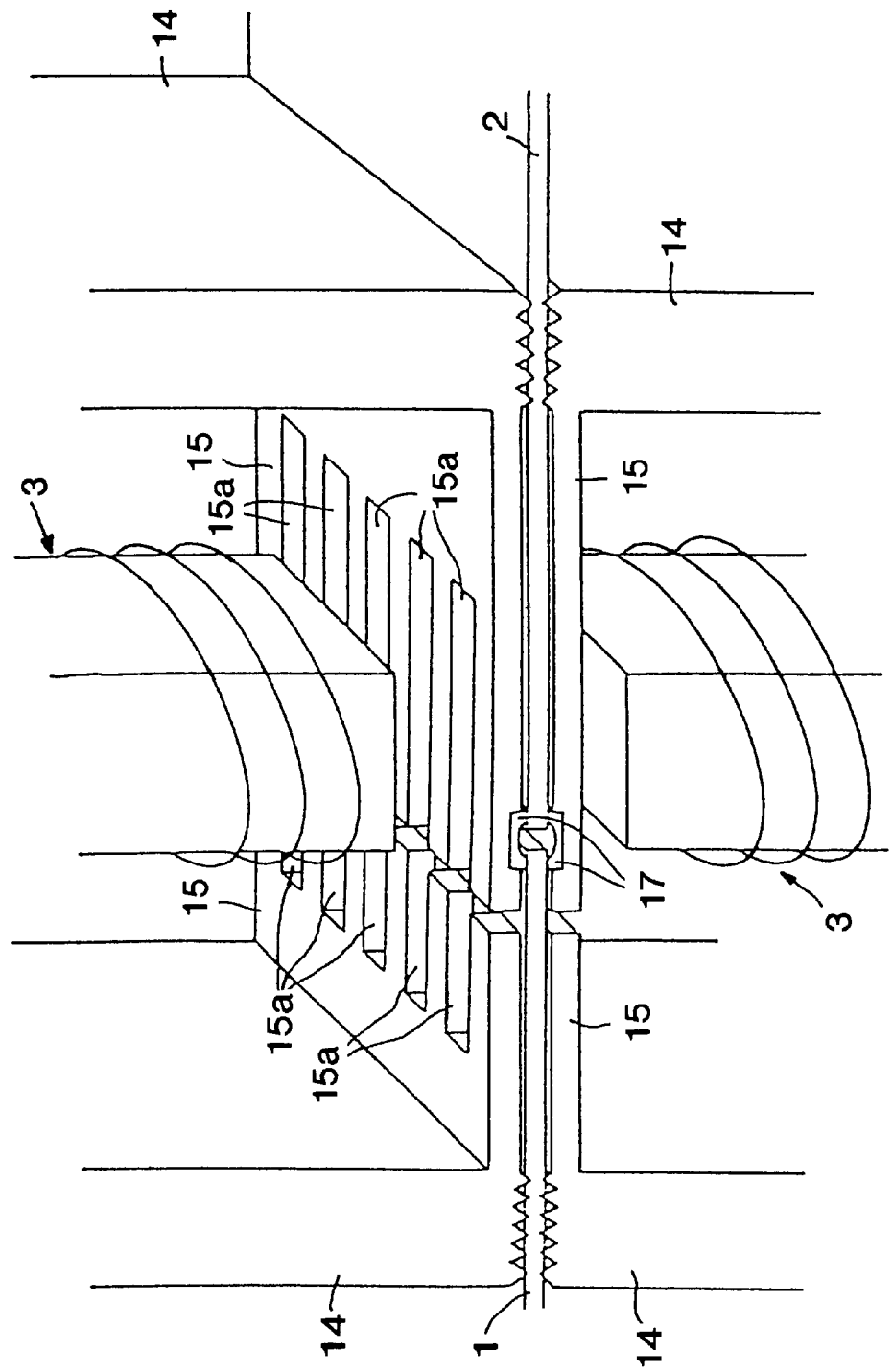
FIG. 12 is a view showing the structure of the metal blocks joining apparatus.

FIG. 12 shows another embodiment of the joining apparatus according to the invention, in which one set of the seizing portions 15 of the clamps 14 is made to have such a length as to extend over the preceding metal block 1 and the succeeding metal block 2, and provided with an insulation material 17 in that region which extends over both of the metal blocks at the seizing portion 15, that is, between the metal blocks.

Hydraulic cylinders or the like driving means (not shown) are connected to the clamps 14 for clamping the preceding metal block 1 and the succeeding metal block 2 one above the other and thereby restraining them. The driving means are vertically movable toward and away from each other. The seizing portions 15 may be constituted by SUS304, titanium, tungsten and the like, and are connected to the clamps 14 for preventing the end portions of the metal blocks from being joined to each other with a vertical dislocation as the metal blocks are pressed to each other, and also for preventing occurrence of bucklings. Each of the seizing portions is provided with a notch portion 15a that is notched in a comb-like manner at regular intervals along the widthwise direction of the metal block, and also with an insulating material 17. Since the end portions of the metal blocks are heated to high temperature and may be partly melted, the insulating material comprises a ceramic and the like material having sufficient heat resistance, heat impact resistance and high-temperature strength.

Figure 13:
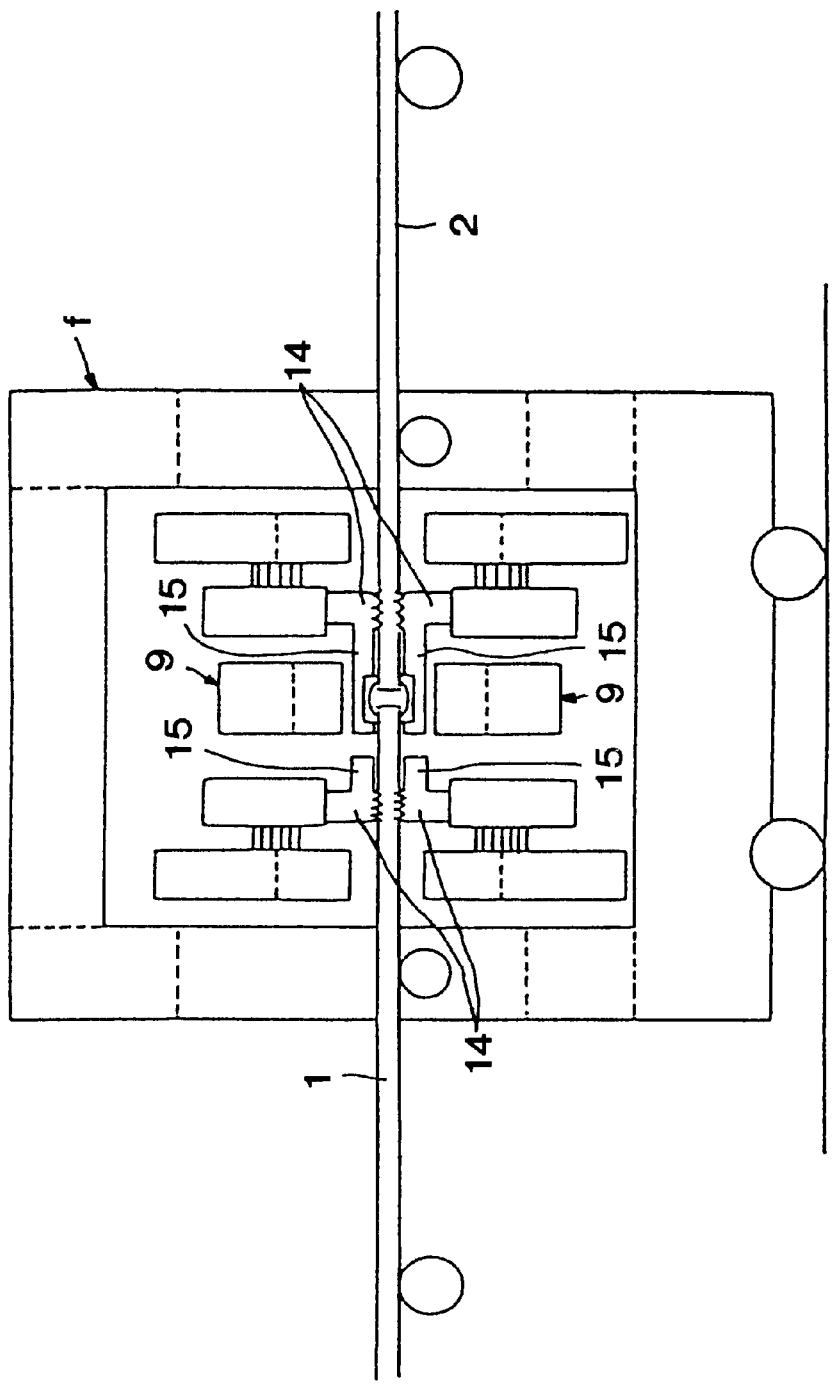
FIG. 13 is a view showing the entire structure of the apparatus shown in FIG. 12.
Figure 14:
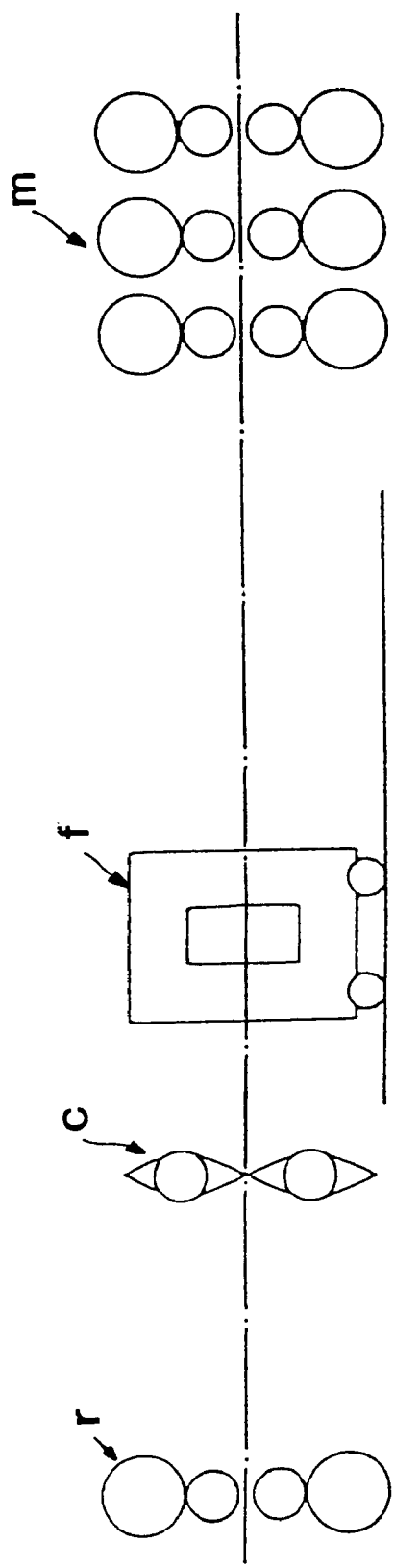
FIG. 14 is a view showing a state in which the joining apparatus is arranged in line with the continuous hot rolling equipment.

The entire construction of the joining apparatus shown in the above-mentioned FIG. 12 is illustrated in FIG. 13, and a state in which said apparatus is arranged in line with the continuous hot rolling equipment is illustrated in FIG. 14.

In FIG. 13 and FIG. 14, reference symbol "r" denotes a rough rolling mill, "c" is a Crop shear for working the end portion of the metal block in a desired shape, "m" is a group of finish rolling mills, and "f" is a movable frame constituting the joining apparatus. There may be arranged a winding/unwinding apparatus (not shown) for ensuring a time adjustment of the joining work and the rolling work of the metal blocks, between the rough rolling mill "r" and the Crop shear "c" in FIG. 14.

In order to form a butt-joint between the preceding metal block 1 and the succeeding metal block 2 at their respective end portions by using the apparatus shown in FIG. 12, the preceding metal block 1 is restrained and positioned by the clamps 14 as shown in FIG. 15(a), and the succeeding metal block 2 is subsequently restrained and positioned by the other clamps 14 such that a gap "g" is formed between the preceding metal block 1 and the succeeding metal block 2. The metal blocks are then heated to an elevated temperature by the induction heating coil 9. The clamps 14 of which the seizing portions 15 extend over both of the metal blocks are moved as shown in FIG. 15(b), with the metal blocks caused to slide at the insulation portion, to butt the succeeding metal block 2 against the end surface of the preceding metal block 1. In this instance, the preceding metal block 1 may be moved toward the succeeding metal block 2.

The apparatus constituted as shown in the above-mentioned FIG. 12 has been illustrated as an embodiment in which the seizing portions 15 are extended over the preceding metal block 1 and the succeeding metal block 2 together with the insulating material 17. However, according to the invention, the seizing portions 15 can be arranged on the respective clamps 14 of the preceding metal block 1 and the succeeding metal block 2, as shown in FIG. 16. In this instance also, it is possible to prevent dislocation, in the vertical direction, of the metal blocks when they are pressed to each other.

However, such a construction may have disadvantageous facet in preventing the vertical dislocation or bucklings of the metal blocks for ensuring a positive joining. Thus, it is preferable to arrange the seizing portions 15 so as to extend over both of the preceding metal block 1 and the succeeding metal block 2.

This is due to the following reasons. It is important for the butted faces of the preceding metal block 1 and the succeeding metal face 2 to be aligned with the center of the induction heating coil 9, i.e., the dimensional center of the metal block in the longitudinal direction thereof, though certain dislocation is inevitable upon positioning. Also, when carrying out the heating between the preceding metal block 1 and the succeeding metal block 2 to an elevated temperature, there may be instances wherein the metal blocks are intentionally dislocated to perform an asymmetrical heating. In this case, if both of the metal blocks are pressed to each other as shown in FIG. 16, the end portions of the metal blocks exhibit an enhanced tendency to be dislocated in a vertical direction, and the dislocation amount increases when the metal blocks themselves are curved. Accordingly, it is most appropriate to provide one set of the clamps for restraining the metal blocks, with the seizing portion 15 having the insulation material 17 so that, upon pressing the preceding metal block 1 and the succeeding metal block 2, the level of both of the metal blocks are aligned with each other.

The reason why the insulating material 17 is disposed on the seizing portion 15 is that, when the seizing portion 15 is disposed to extend over both of the metal blocks, the metal blocks are brought into contact with the seizing portion 15 so that an induced current flows between both of the metal blocks through the seizing portion 15, thereby making it difficult to effectively heat the end portions of the metal blocks to an elevated temperature.

As shown in the above-mentioned FIG. 16, also when the seizing portions 15 are disposed on the respective metal blocks, the insulating material 17 is preferably arranged between the seizing portion 15 and the metal blocks so as eliminate the influence of the induced current to the metal blocks.

In FIG. 12 mentioned above, there is shown one embodiment in which the seizing portion 15 disposed on each of the preceding metal block 1 and the succeeding metal block 2 includes a notch portion 15a. However, when one of the seizing portions 15 is shifted from the position of the induction heating coil 9, or when the induced current due to the application of the alternating magnetic field by the induction heating coil 9 does not give rise to particular problems, it is not necessary for the other of the seizing portion 15 to have the notch portion 5a.

Moreover, when the magnetic flux due to the induction heading coil 9 is applied not only to the seizing portions 15 but also to the clamps 14, the notch portions 5a are preferably extended and formed to reach to the clamps 14.

Figure 17:
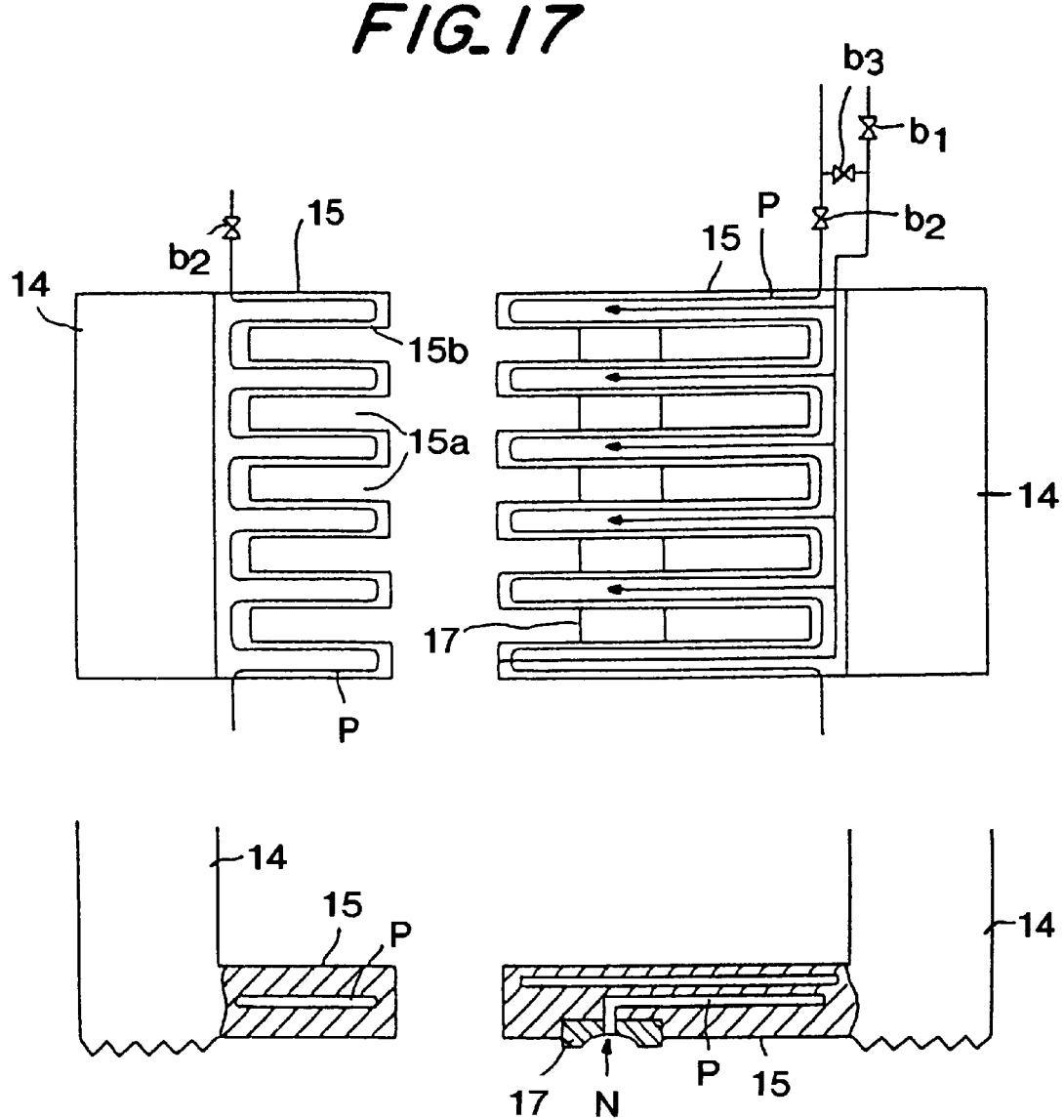
FIG. 17 is a view showing the structure of the joining apparatus according to another embodiment.

FIG. 17 shows one embodiment in which a cooling water passage "p" is disposed inside the seizing portion 15 to realize a water cooling type structure, and a nozzle N is disposed through the insulating material 17 for ejecting a non-oxidizing or reducing gas or a cooing water onto the to-be-joined face of the metal blocks.

When the temperature of the seizing portion 15 is inevitably increased upon heating the metal blocks, the increase can be suppressed by circulating the cooling water inside the seizing portion 15. Moreover, upon butt-joining of the metal blocks, the non-oxidizing gas or reducing gas is ejected onto the to-be-joined face by performing a changeover from the nozzle N to valves $b_1$–$b_3$ so that the ejected portion is prevented from oxidization, thereby making it possible to realize a joined portion with high strength. The strength can be further improved by changing over the valves $b_1$–$b_3$ after completion of the joining, so as to eject the cooling water onto the joined portion and lower the temperature of the ejected portion. It should be noted that the joined portion may be broken upon variation of tension or the like, when the temperature of the joined portion is 1,450° C. or more. As regards the cooling of the joined portion, it is preferable to effect the cooling at a flow rate of 100–400 t/h (one side face). There may be used a nozzle N of 1–2 mm in diameter, or of a slit type which is about 1 mm in gap and 5–10 mm in width.

In FIG. 17, the cooling water and the like is ejected through the seizing portion 15 and the insulating material 17. However, as shown in FIG. 18, the nozzle N may be directly attached to the insulating material 17 through the notch portion 15a.

When the seizing portion 15 and the insulating material 17 are disposed on each of the metal blocks as shown in FIG. 16, the nozzles N may be disposed onto the leading ends of the seizing portions 15, respectively, as shown in FIG. 19.

FIG. 20 shows one embodiment of the metal blocks joining apparatus provided with a seal box 18 which surrounds a rear end portion of the preceding metal block 1 and a fore end portion of the succeeding metal block 2, for maintaining the surrounded portions at an atmosphere of the non-oxidizing gas or reducing gas. The seal box has an expansion/contraction function so as to prevent interference with the clamps 14 as they are moved in a vertical direction.

By introducing the non-oxidizing gas such as $N_2$ gas and the like into the seal box 18, the inside of the seal box 18 can be maintained at an atmosphere which is suitable for joining. In this case, while the arrangement for exhausting the introduced gas is not shown in the drawings, a gas suction hole may be disposed in another side of the seal box 18 to discharge the gas therefrom.

The metal blocks can be advantageously joined to each other by using the seal box 18 shown in FIG. 20, particularly when the object is a metal which cannot be easily joined in the atmosphere, such as stainless steel including Cr, high carbon special steel having a low melting temperature, high manganese steel and the like.

The gas to be introduced into the seal box may be $N_2$ gas, Ar gas and the like, or may be a non-oxidizing gas such as $H_2$ gas, CO gas and the like. When such gas is used, the flow rate should be about 1–10 $Nm^3/min$.

When the metal block is carbon steel, for example, the oxide generated upon heating is ferrous oxide (FeO) and the melting point thereof is about 1,370° C. Even when it is mixed, for example, with MnO and the like, the melting temperature is in the vicinity of said temperature. It should be noted that the melting temperature of the metal changes depending upon the amount of carbon content. With respect to a steel having a solidus curve higher than the melting temperature of FeO, when the temperature is between the solidus curve and the melting point of FeO, the molten oxide can be discharged from an interface between the metal blocks when deforming the metal upon pressing the metal blocks.

Incidentally, as for a steel having a carbon content of about 0.70%, a solidus curve temperature where a dissolution is initiated substantially agrees with the melting point of Fe oxide, so that the oxide on the interface generated upon heating the metal block is not melted and may be left on the interface of the joined portion, making it difficult to obtain a satisfactory joined portion.

Moreover, since the oxide generated on the stainless steel is Cr oxide which is very strong and has a melting point much higher than that of the metal, when the metal blocks are joined by being heated in the atmosphere, the oxide is left on the interface as described above and it is thus very difficult to obtain a satisfactory joined portion.

These problems can be advantageously mitigated by using the seal box 18 such as that shown in FIG. 20.

Investigation has been carried out to ascertain the forming state of oxide with respect to metal blocks comprised, respectively, of an extremely low carbon steel and a stainless steel each cut by a Crop shear, whose end portions were maintained at 950–1,000° C. in the atmosphere for 15 seconds. As a result, it has been found that an oxide layer of several $\mu m$ in thickness was formed in case of the extremely low carbon steel, though formation of oxide was hardly recognized in case of the stainless steel. Incidentally, when these steels are further heated upto 1,400° C., oxide layer of about 60–70 $\mu m$ in thickness is formed in case of the extremely low carbon steel and also the oxide layer of several $\mu m$ is formed in case of the stainless steel. However, formation of such oxide layer can be prevented by establishing a non-oxidizing or reducing atmosphere only during the heating.

Moreover, in order to prevent oxidization of the to-be-joined face during the heating, it is preferable to adjust the atmosphere such that the oxygen concentration becomes 1% or less in case of the carbon steel, and about 0.1% in case of the stainless steel.

FIG. 21 shows a modified embodiment of the apparatus in FIG. 12 mentioned above. The embodiment shown in FIG. 21 has a construction in which the upper clamp 14 for restraining the metal blocks is vertically movable, and the seizing portion 15 disposed on one of the lower clamps 14 is adapted to slide on the sliding plate "t" disposed on the other of the lower clamps 14.

Such an arrangement of the apparatus ensures that the level of the lower clamps 14 is maintained constant and thus serves to advantageously improve the positioning accuracy in joining the metal blocks and the strength of the clamps.

By constructing the metal blocks joining apparatus as described above, the metal blocks can be effectively heated to an elevated temperature, and the vertical dislocation or the like caused during the pressing of the metal block can be minimized.

Next, explanation will be made of the joining apparatus having a construction in which the clamps and the pressing means are adapted to move in the widthwise direction of the metal block independently of the heating means for lower the thermal load, etc., to which the clamps and the pressing means are subjected.

Figure 22:
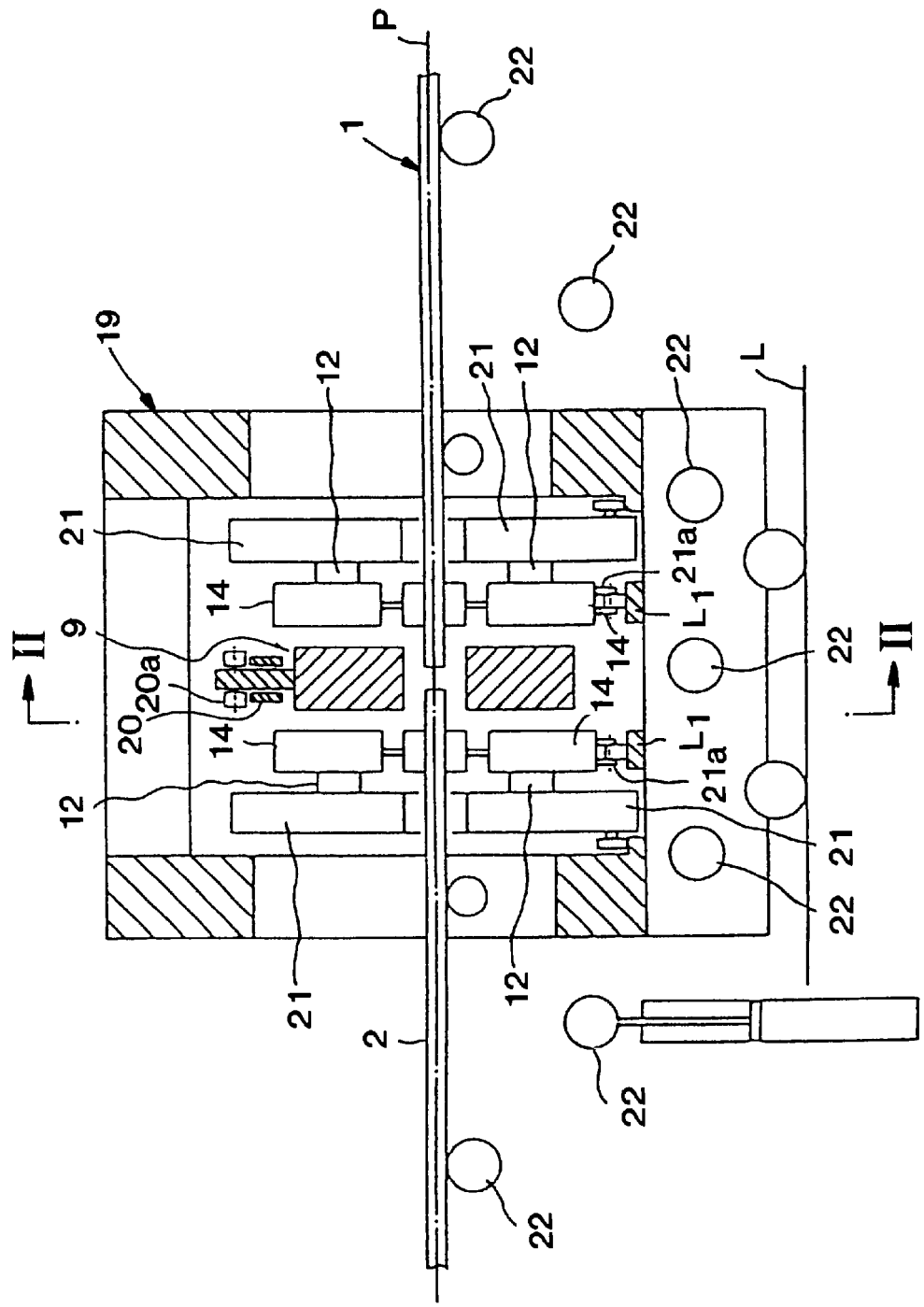
FIG. 22 is a view showing the structure of the joining apparatus in which the clamps, pressing means and heating means are individually movable.

The construction is shown in FIG. 22 to FIG. 24.

In the drawings, reference numeral 19 denotes a carriage which is movable on a rail L disposed along a conveying line of the metal blocks. The induction heating coil 9 as the heating means is shown as, for example, a C-shape core for sandwiching the metal blocks from above and below, and is provided with a coil wound around the core and an electric source (not shown). The induction heating coil 9 is suspended and supported on a frame 20 (moving means) through wheels 20a, and the frame 20 extends along the widthwise direction of the metal block in the carriage 19, such that the induction coil 9 is adapted to move independently in the widthwise direction of the metal block in the carriage 19 as shown in FIG. 23. The moving means in the carriage 19 of the induction heating coil 9 may be of a slide type.

Also, reference numeral 21 denotes a frame (moving means) of an integral type including upper and lower portions, which is movable in the widthwise direction independently of the induction heating coil 9. The frame 21 comprises clamps 14 for adjusting the levels of the metal blocks, and a hydraulic cylinder (pressing means) 12 for moving and pressing at least one of the preceding metal block and the succeeding metal block toward each other when they are press-sandwiched and supported by the clamps 14. As a moving mechanism disposed in the carriage 19 of the frame 21 for moving the clamps 14 and the hydraulic cylinders 12, there may be provided a mechanism comprising a rail $L_1$ and wheels 21a adopted to the rail $L_1$, though a moving mechanism such as a roller type mechanism, a slide type mechanism or the like may also be applied. It should be noted that the moving mechanism is not shown in FIG. 23 and FIG. 24. Further, reference numeral 22 denotes table rollers for conveying the metal blocks, which are vertically movable according to the movement of the carriage 19 so as to achieve a function of preventing collision against the carriage 1.

In thus constructed metal blocks joining apparatus, the joining of the preceding metal block 1 and the succeeding metal block 2 is carried out, as shown in FIG. 22 and FIG.

23, by restraining the end portions of the metal blocks by the clamps 14 moved in the carriage 19 into the in-line position, heating each end portion to an elevated temperature by the induction heating coil 9 which has been moved in the carriage 19, and pressing at least one of the preceding metal block 1 and the succeeding metal block 2 toward each other by the hydraulic cylinders 12 which have been moved together with the clamp 14 into the in-line position to thereby butt the respective metal blocks to each other.

After completion of one cycle of continuous rolling wherein 15 metal blocks, for example, are joined and then transferred to a group of hot finish rolling mills, as shown in FIG. 24, the induction heating coil 9 is moved along the frame 20 and a frame 21 provided with the clamps 14 and the hydraulic cylinders 12 is moved along the rail $L_1$ from the conveying line P of the metal blocks so that the induction heating coil 9 assumes a waiting position until arrival of the next metal blocks. Incidentally, when the clamps 14 and the hydraulic cylinder 12 are supposed to be moved off the line in the course of conveying the metal blocks, it is preferable for the frame 21 to be formed into the same C-like shape as the induction heating coil 9, or as a frame which can be opened vertically.

FIG. 25 shows one embodiment of the continuous hot rolling equipment of the metal blocks, in which the joining apparatus constructed as above can be suitably arranged.

The joining apparatus is arranged between the cutting apparatus 23 on the outlet side of the rough rolling mill "r" for finishing the end portion of the metal block in a predetermined plain shape prior to the joining of the metal blocks, and a group of hot finish rolling mills 24. In such a type of continuous hot rolling equipment, there may be instances in which a winding/unwinding apparatus is arranged on the outlet side of the rough tolling mill "r" in order to adjust the treating amount in the rough rolling and finish rolling steps.

FIG. 26 shows a conveying state of the metal blocks in the carriage 19, with the induction heating coil 9, the clamps 14 and the hydraulic cylinder 12 moved off the line.

Usually, the metal blocks are conveyed in the carriage 19 while being slid. However, in the apparatus according to the invention, the inside of the carriage 19 can be made empty, so that vertically movable support rollers 25 are additionally disposed therein so as to support the metal blocks. The support rollers may be of a type in which the rollers are attached to the carriage 19 and caused to move upwards only when they are used, or of a type in which the rollers are arranged below the carriage 19 for avoiding collision with the carriage 19 as it moves, and are caused to move upwards only when they are used. Such an arrangement serves to advantageously prevent formation of scratches due to scales deposited in the carriage 19.

As described above, in the joining apparatus constructed as shown in FIG. 22 to FIG. 24, the clamp and the pressing means subjected to a substantial thermal load are moved off the line when the metal blocks need not be joined, so that their life time can be extended and it becomes possible to prevent formation of scratches due to the deposition of scales. Further, when maintenance is required for some troubles, the operation can be continued without stopping the operation of the line, by substituting another frame provided with the clamps and the pressing means. It is thus possible to perform a hot rolling with a high productivity, requiring a relatively small space since the entire joining apparatus need not be moved.

A table roller device for conveying the metal blocks will be described below.

Figure 27:
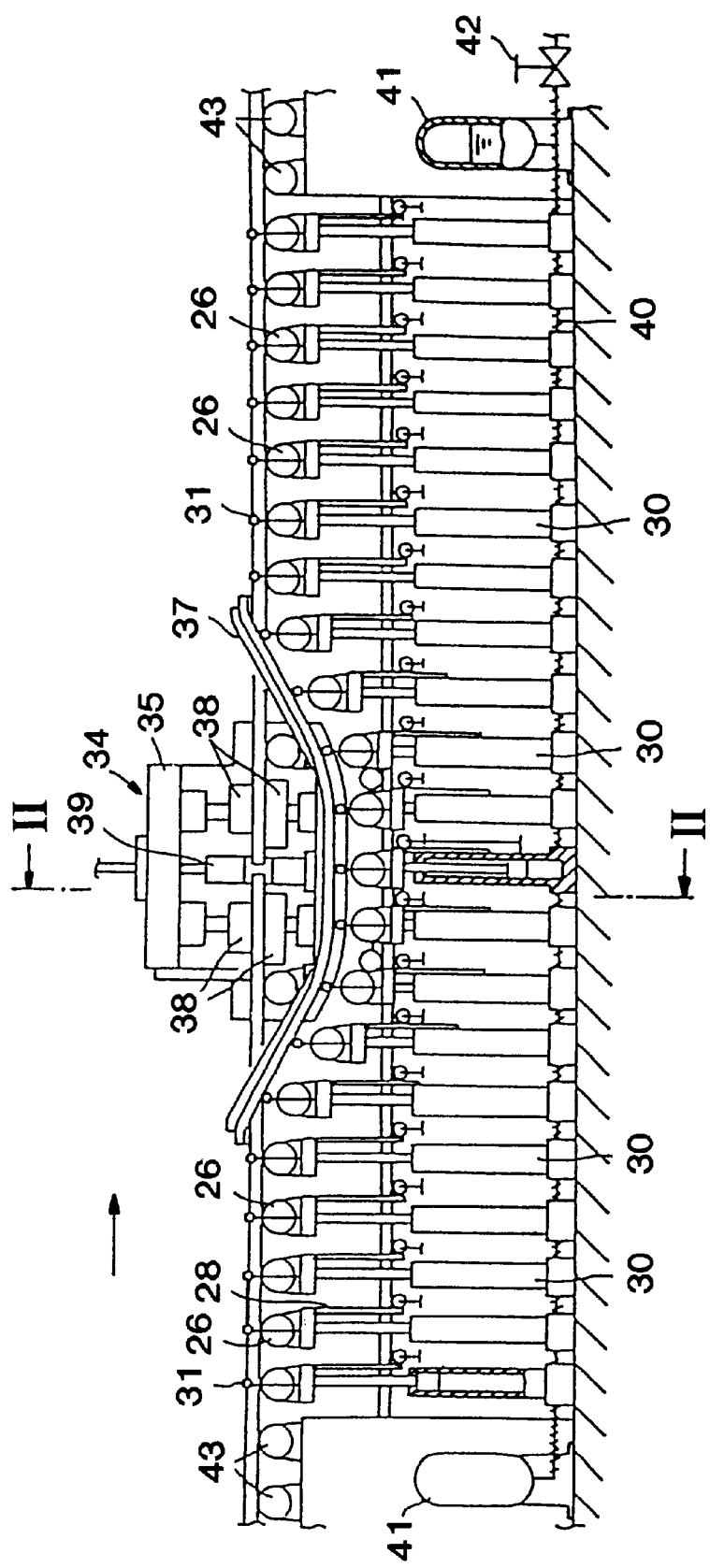
FIG. 27 is a view explaining the structure of the table roller conveyor for conveying the metal blocks.
Figure 28:
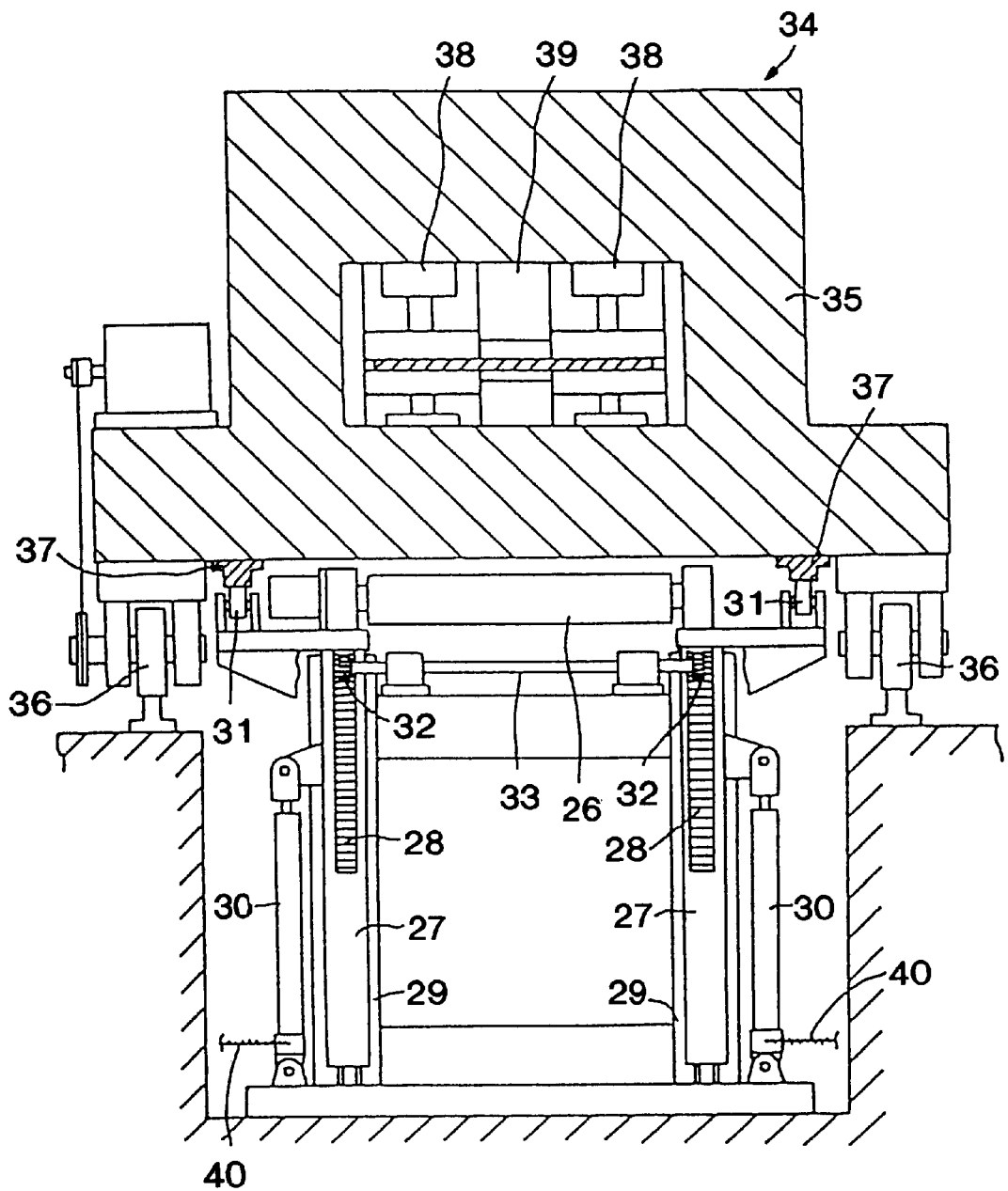
FIG. 28 is a sectional view taken along the line II—II of FIG. 27.

The construction is shown in FIG. 27 and FIG. 28, of which the latter is a sectional view taken along the line II—II of FIG. 27.

In the drawings, a table roller device for conveying the metal blocks comprises a plurality of rollers 26 for supporting the metal blocks at a plurality of positions along the longitudinal direction of the metal blocks. For each table roller, both ends thereof are rotatably supported on a set or pair of table roller supporting members 27. A rack 28 is attached on a side face of each table roller supporting member 27 and mounted movably along a vertical guide frame 29. Reference numeral 30 denotes cylinders (i.e., balance cylinders) connected at one end to the guide frame 29 and at another end to the table roller supporting member 27. Reference numeral 31 denotes guide rollers, which are held rotatably on the upper portion of the guide frame 29.

Reference numeral 32 denotes pinions connected to a mechanical tying shaft 33 and supported rotatably on the upper portion of the guide frame 29.

Reference numeral 34 denotes a joining apparatus movable along the rail $L_2$, which is provided with a frame 35, wheels 36, boat-like guide rails 37 disposed on both sides of a lower face of the frame 35 and having an inlet portion and an outlet portion both inclined toward a center portion thereof, clamps 38 for sandwiching the metal blocks from above and below to restrain them, and a heating means 39.

Reference numeral 40 denotes a hydraulic pipe connected to head sides of the respective cylinders 30 and provided with an accumulator 41 and a shut valve 42 on the way upto the rolling apparatus (not shown).

Reference numeral 43 denotes fixed table rollers which are not allowed to undergo a vertical motion and which are disposed on the inlet and outlet sides of the metal blocks joining apparatus 34 and used for conveying the metal blocks.

In thus constructed table roller device for conveying the metal blocks, a predetermined pressure is applied to the inlet side of each cylinder 30 and the accumulator 41, and the pressure is maintained by closing the shut valve 42.

The metal blocks are conveyed through the table roller 43 with the joining apparatus 34 shifted toward a side in which the succeeding metal block is conveyed, and the joining apparatus 34 is then moved at the same speed as the metal blocks when they reach the joining apparatus 34. The preceding metal block 1 and the succeeding metal block 2 are then restrained by the clamps 38, respectively, and then heated to an elevated temperature by the heating means 39 until the metal blocks reach a stop end of the joining apparatus 34, where the joining of the metal blocks is finished.

When the joining apparatus 34 moves, the guide rail 37 moves together with the joining apparatus 34. On this occasion, the guide rollers 31 and the table rollers 26 situated between the inclined inlet portion and the center portion of the guide rail 37 are caused to move upwards according to the passage of the joining apparatus 34. Conversely, the guide rollers 31 and the table rollers 26 situated between the inclined outlet portion and the center portion of the guide rail 37 are urged by the inclined outlet portion and the center portion of the guide rail 37 due to the arrival of the joining apparatus 34 and thereby caused to move downwards. Accordingly, the metal blocks are prevented from colliding against the frame 35 constituting the joining apparatus 34.

The metal blocks conveying table roller device according to the invention is so constructed that the head sides of the respective cylinders 30 for supporting the table rollers 26 together with the supporting member 27 from below are connected to each other by the hydraulic pipe 40, forming a hydraulic circuit for maintaining the pressure in the respective head sides at a constant pressure. Thus, the oil inside the cylinder 30 associated with the table rollers 26 and the supporting members 27 which have moved downwards is merely transferred to the cylinder 30 associated with the table rollers 26 and the supporting members 27 which have moved upwards, thereby making it possible to positively support the metal blocks while the table rollers are prevented from colliding against the joining apparatus 34. It is unnecessary to operate or control the valves for this purpose.

In the construction having the supporting members 27 for supporting the table rollers 26 at the respective shaft ends thereof, by connecting the both side portions of the supporting members through the mechanical tying shaft 33, the table rollers 26 are always held horizontally even when the guide rollers 31 are not guided on the guide rail 37, so that the metal blocks can be positively supported and conveyed.

As shown in FIG. 27 and FIG. 28 mentioned above, when, for example, the heating means, the pressing means and the clamps are taken out from the joining apparatus 34 and only the frame 35 is arranged at the in-line waiting position where the metal blocks are not joined, the metal blocks may not be properly supported in the frame 35 by the table rollers 26.

Figure 29:
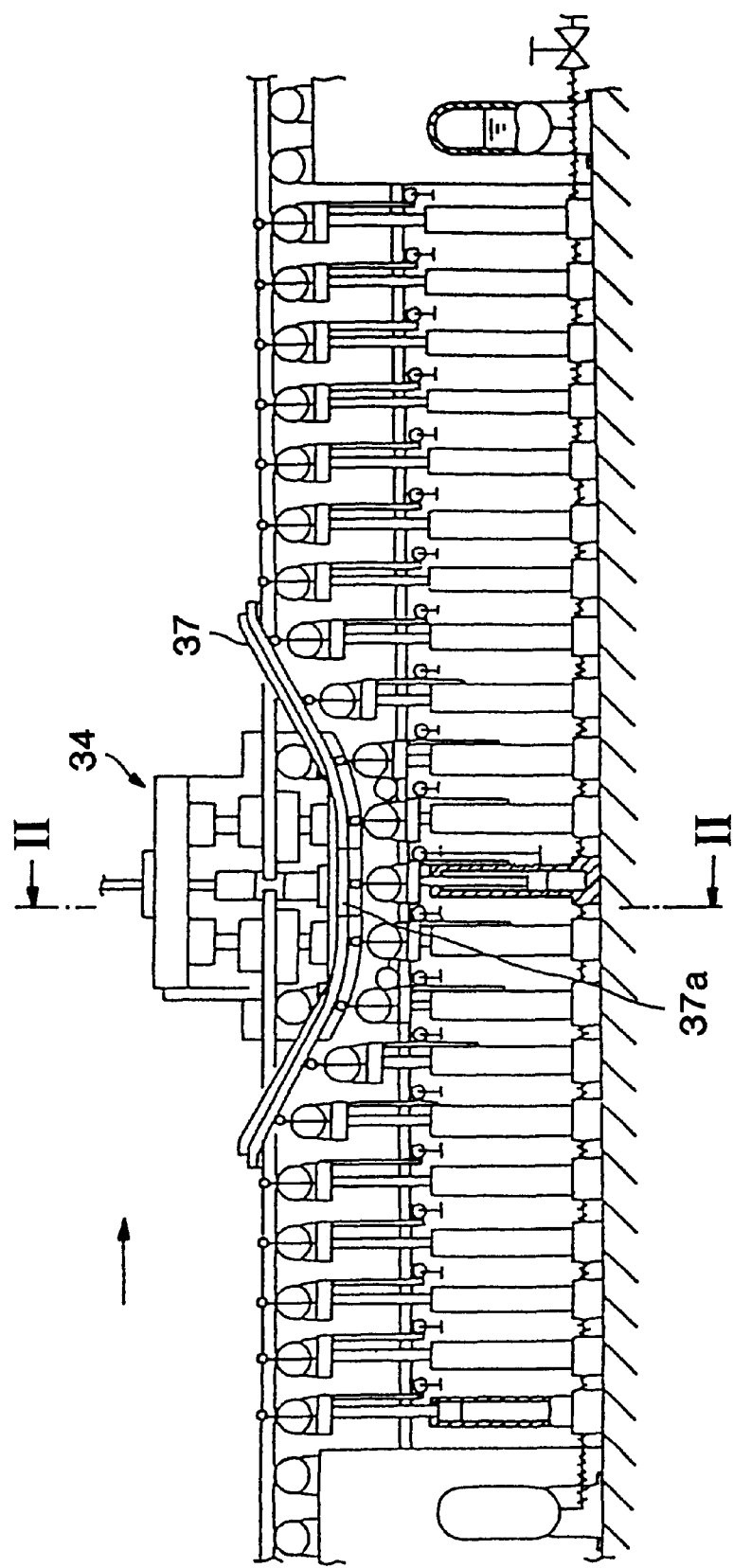
FIG. 29 is a view showing another embodiment of the table roller conveyor shown in FIG. 27.
Figure 30:
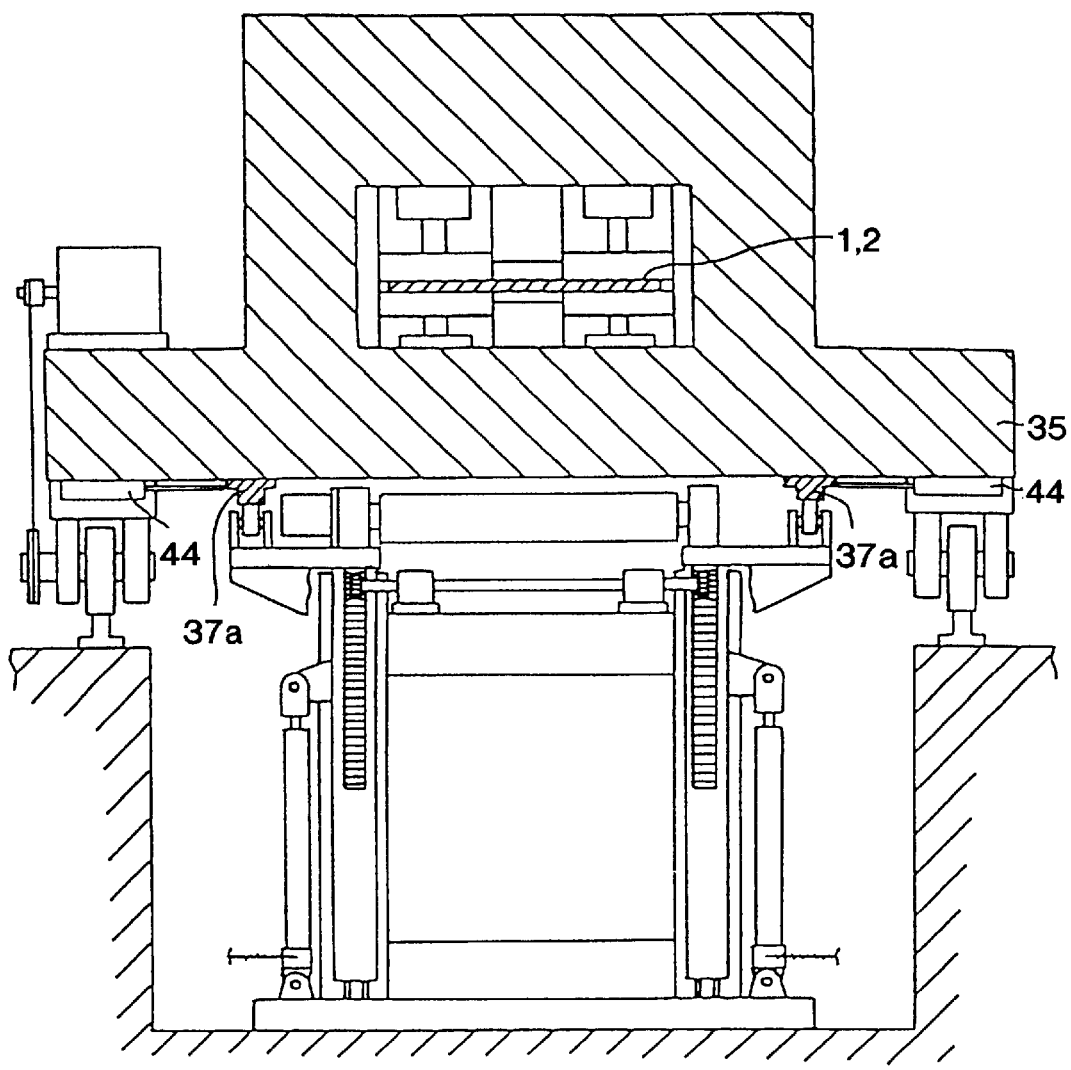
FIG. 30 is a sectional view taken along the line II—II of FIG. 29.
Figure 31:
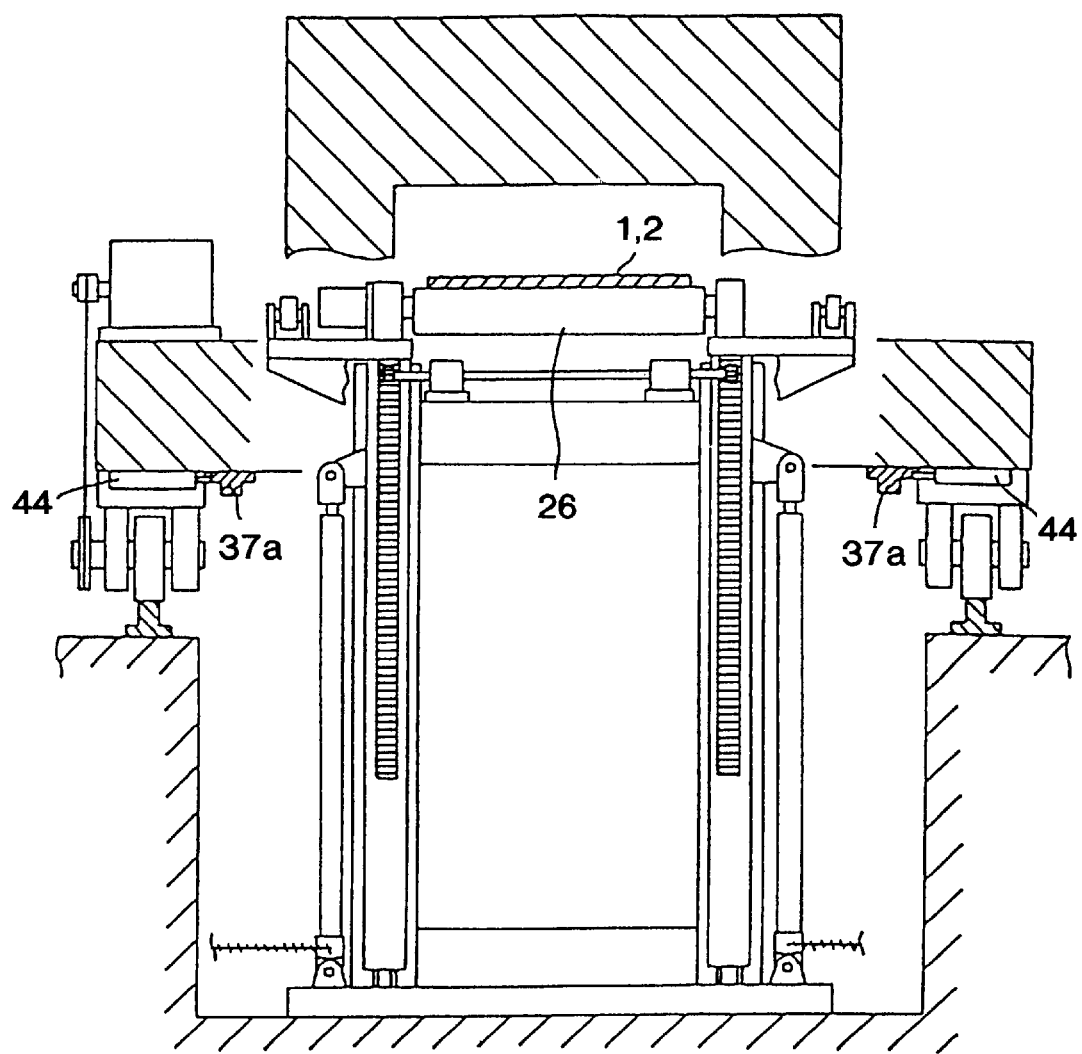
FIG. 31 is a view explaining a state in which the table roller conveyor shown in FIG. 29 is operated.

In this case, as shown in FIG. 29 and FIG. 30 which is a sectional view taken along the line II—II in FIG. 29, a detachable shift guide rail 37a is disposed on, for example, a center portion of the guide rail 37 and the shift guide rail 37a is moved in a direction away from the conveying line as shown in FIG. 31 by a shifting cylinder disposed on the frame 35, to thereby ensure a space through which the table rollers 26 can be moved upwardly so as to face the conveying line.

In order to cause an upward movement of the table rollers 26 existing in that area, the pressure of the hydraulic pipe 40 is once lowered and the shift guide rail 37 is moved in a direction away from the conveyer line. Then, by applying a pressure to the hydraulic pipe 40, the table rollers 26 are moved upwardly via the cylinders 30 and table roller supporting members 27.

For performing the abovementioned operations, the shut valve 42 is preferably comprised of a three-way valve and the like, having the functions of opening, closing and pressure-releasing.

Moreover, FIG. 29 to FIG. 31 show an embodiment of the shift guide rail 37a having a length which is sufficient for causing an upward movement of only one of the table rollers 26. However, when the guide rails 37 are long enough to allow an upward movement of a plurality of the table rollers, it is enough to lengthen the shift guide rails 37a by a corresponding amount.

In the metal blocks conveying table roller device constructed as above, the cylinders 30 supporting the table rollers 26 from below are equivalent in pressure with each other, and the sum of descending displacements of the respective table rollers moved by butting the guide rail 37 with the guide rollers 31 is always constant. Thus, only by maintaining a constant pressure in the hydraulic circuit including the cylinder 30, the hydraulic pipe 40, accumulator 41, and the shut valve 42, the vertical motion can be performed without additional provision of a hydraulic apparatus and the like having an electromagnetic valve for the vertical motion, so that the power required for driving the guide roll can be saved.

Moreover, both ends of the table rollers 26 are connected through the mechanical tying means and are thus always maintained at the same level. Thus, even when the guide rollers 31 turn out not to be guided on the guide rail 37, the table rollers 26 facing the conveying line can be held horizontally due to an urging force in the head side of the cylinder 30, thereby allowing the metal blocks to be positively supported and conveyed.

Hereinafter, explanation will be made of the removal of the poor joined portion formed inevitably by pressing upon joining the steel blocks.

Figure 32:
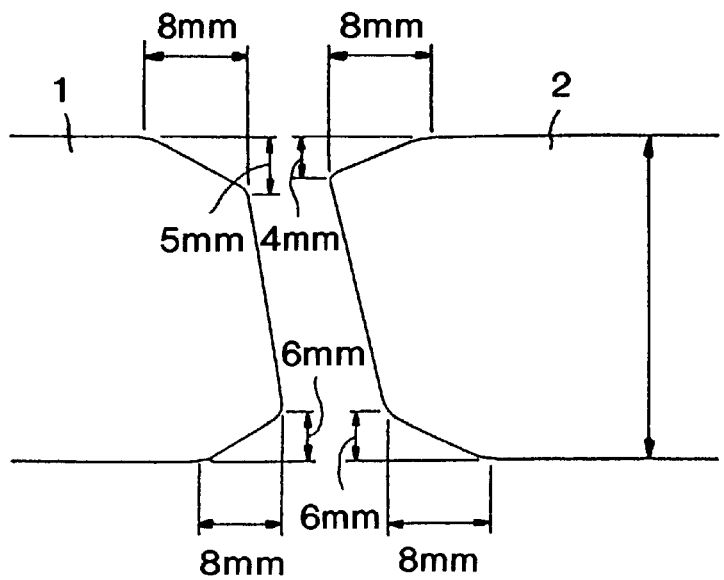
FIG. 32 is a sectional view showing the preceding metal block and the succeeding metal block after cutting.

It is a general practice to use a shear for usual Crop cutting, in order to make the end portion of the metal block into a sectional shape suitable for joining. There are various kind of shears such as a rotating drum type, a crank type, a pendulum type and the like. These are used properly according to a joining state of the metal blocks, though the resulting end portions inevitably have a sectional shape as shown in FIG. 32, with a material flow or plastic deformation of a dimension of about 4×6 mm–5×8 mm.

Figure 33:
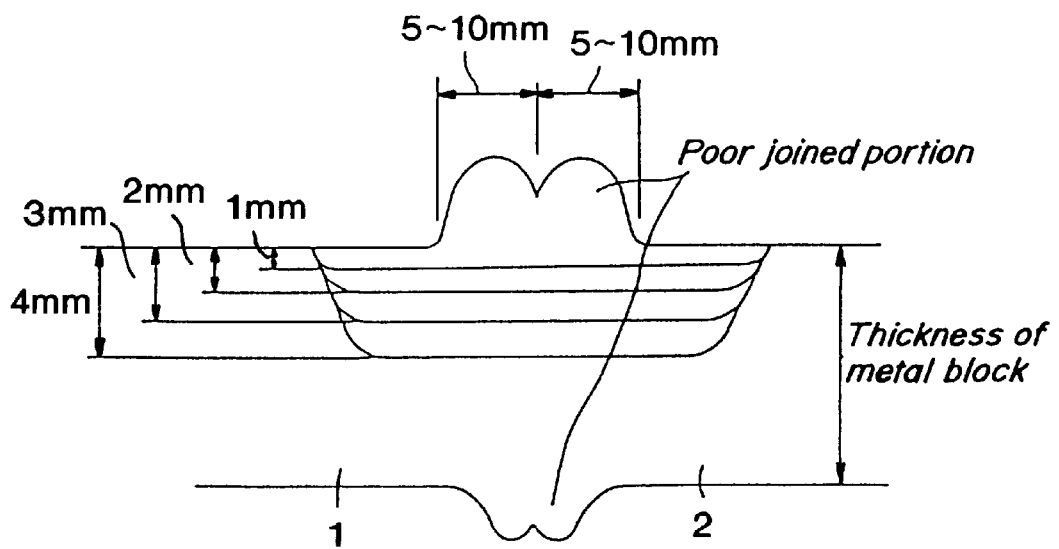
FIG. 33 is a side view showing a poor joined portion formed by pressing of the metal block.

The end portion of the preceding metal block and the end portion of the succeeding metal block having such a sectional shape are induction-heated in a contact-free state and then pressed in a range of about 8–10 mm enough for joining, as a result at which the joined portion of the metal blocks has a sectional shape as shown in FIG. 33. After the poor joined portion is removed in respective four levels in depth of 1 mm, 2 mm, 3 mm and 4 mm, the hot finish rolling is performed thereto. In this case, it has been confirmed that the scabs are not generated and the plate is not broken during rolling, when the cutting is performed deeper than the surface of the base plate of both of the preceding metal block and the succeeding metal block even in any of the depths.

Also, even with the end portions of the metal blocks moved vertically, i.e., an offset state, the plate is not broken during rolling when the poor portion is removed by cutting the joined portion of the metal blocks deeper than the surface of the base member. The maximum value of the cutting amount on one side is properly set at a value of 12.5% or less of the plate thickness of the metal blocks, from a practical viewpoint of reducing the reaction force or load of the cutter.

Figure 34:
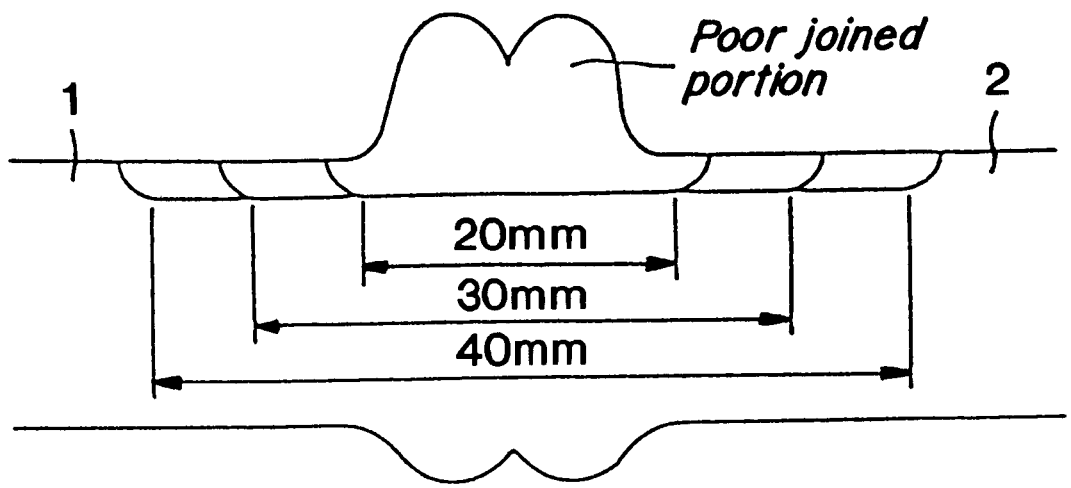
FIG. 34 is a side view showing a poor joined portion formed by pressing of the metal block.
Figure 35:
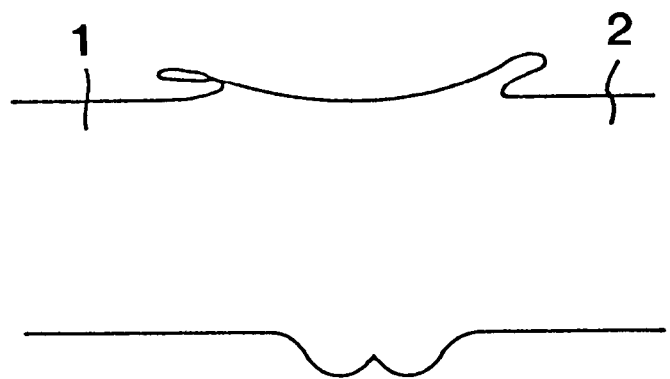
FIG. 35 is a view showing a state after the poor joined portion of the metal blocks has been removed.

By the way, the length of the poor joined portion in the longitudinal direction of the metal block is usually 5–10 mm at one side thereof, which is different according to the frequency of the induction heating and the pressing amount. In order to investigate upto what extent of that portion is to be removed for avoiding the formation of scabs upon rolling, experiments have been carried out by making the poor joined portions which were removed over the length of the same length, 1.5 times and 2.0 times of the poor joined portion as shown in FIG. 34. As a result, it has been recognized that a very soft region of the poor joined portion remains as shown in FIG. 35 when the poor joined portion is removed over a range of about 20–30 mm, which becomes the cause of the scab.

On the basis of such recognition, in order to prevent formation of scabs in the poor joined portion, it is necessary to remove the poor joined portion over a range of at least 20 mm at one side of the metal block, and at least 20 mm respectively from the connected faces when the poor joined portion extends over both of the metal blocks, that is, for the range of total 40 mm in the longitudinal direction of the metal blocks starting from the joined face.

Figure 36A:
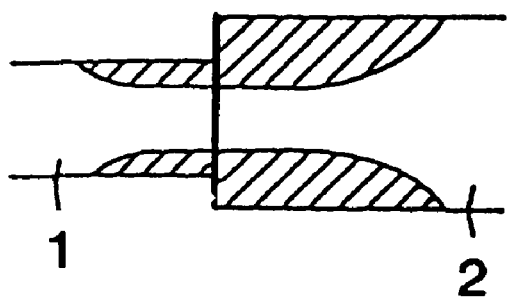
FIGS. 36(a) to 36(c) are views showing removing patterns of the poor joined portion.
Figure 36B:
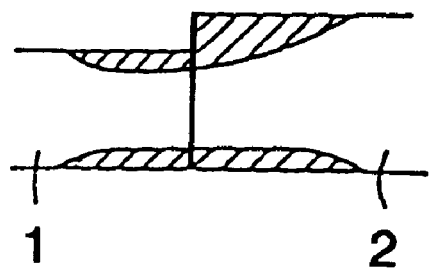
Figure 36C:
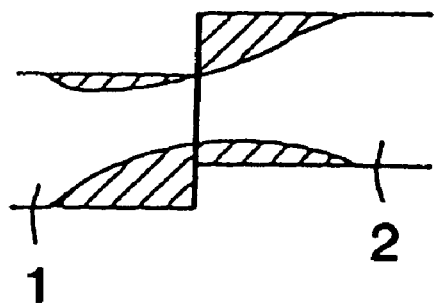

The removal of the poor joined portion is performed with patterns shown in FIG. 36(*a*) to FIG. 36(*c*).

FIG. 36(*a*) and FIG. 36(*b*) show the removing patterns in a case where the plate thickness of the preceding metal block and the plate thickness of the succeeding metal block are different from each other, and FIG. 36 (*c*) shows the removing pattern in a case where the end portions are shifted vertically. Incidentally, although there is not illustrated a case in which removal is performed with respect to the metal blocks of the same plate thickness which are aligned in level with each other, the poor joined portion in this case is removed with the same shaving thickness for the preceding metal block and the succeeding metal block.

As for the removing range of the poor joined portion with respect to the widthwise direction of the metal block, the best approach would be to completely remove the entire range of the poor joined portion. However, in a case where the metal block has a width which is as large as 2,000 mm, it is not easy to do so in view of the equipment specification.

Figure 37:
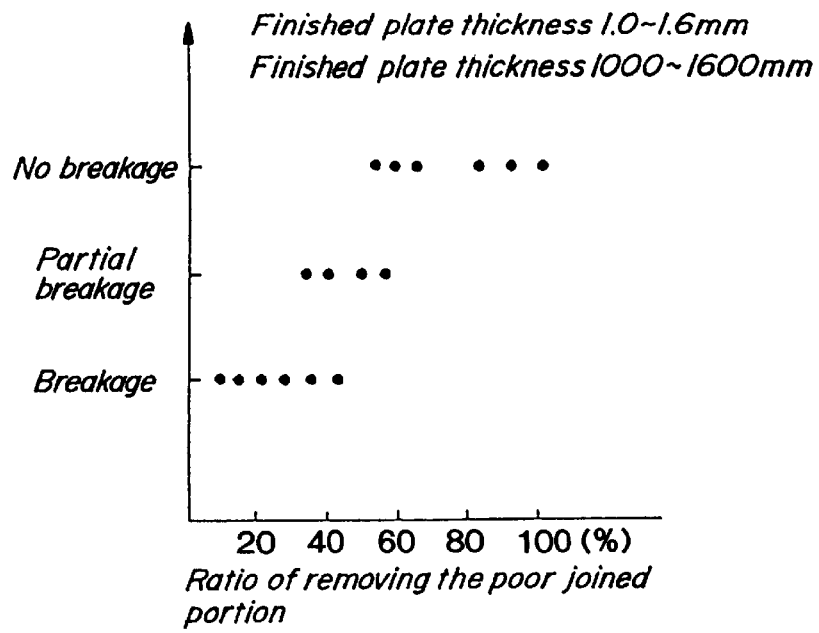
FIG. 37 is a graph showing the relationship between the removing ratio of the poor joined portion of the metal block and the breakage of the plate.

FIG. 37 shows the relationship between the removing ratio in the widthwise direction after the joining of the plate and the breakage of the plate during the rolling, for metal blocks of 1.0–1.6 mm in thickness and 1,400–1,600 mm in width. This clearly shows that when the poor joined portion is removed by 60% or more with respect to the widthwise direction of the metal block, the plate cannot be broken during rolling. Of course, this is based on assumption that the cutting is performed deeper than the surface of the base plate, and the removal is performed over the range of at least 20 mm for one of the metal blocks in the longitudinal direction of the metal block.

When the poor joined portion is completely removed and the depth is finished at a degree of 2 mm±1 mm upon removal of the poor joined portion, a cutter can be most effectively used as the removing means.

When cutting is to be effected with respect to a metal block which is at a temperature above 1,000° C., it is important to minimize the contacting time between the cutter and the material, so that it is indispensable to use a rotating cutter.

Rotating cutters comprising carbide and the like and used for machine tools and the like cannot be used due to violent welding and abasing, and it is most appropriate to use a rotating cutter comprising S55C (carbon steel for mechanical construction member) for a hot saw and the like or SNC (nickel-chrome steel) and the like, in combination with cooling of the cutter.

Figure 38:
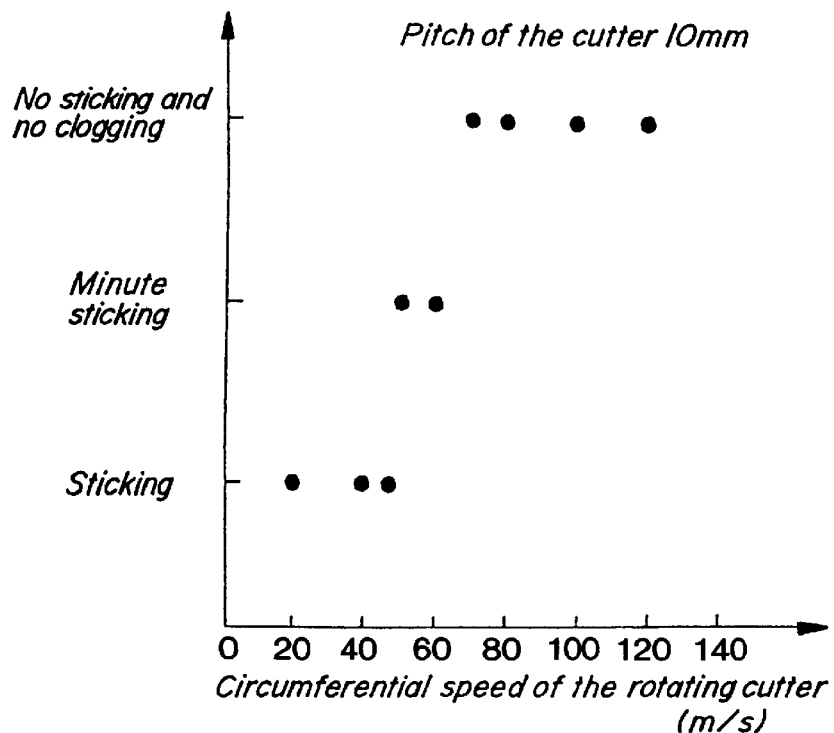
FIG. 38 is a graph showing the relationship between the circumferential speed of the rotating cutter and the seizure and clogging of the cutter.

FIG. 38 shows the relationship between the circumferential speed of the abovementioned rotating cutter and the sticking of the cutter. When such a rotating cutter is used, it is preferable for the circumferential speed of the cutter to be 50 m/s or more, in view of preventing sticking of the cutter. On the other hand, as regards the upper limit, it is preferable for the circumferential speed to be 120 m/s or less, since otherwise the life time of the cutter becomes extremely short.

If the circumferential speed of the rotating cutter is as high as 50 m/s or more, the poor joined portion can be cut and removed without generating vibration (chattering) and the like; so, this is an important condition for a stable operation.

Moreover, it is desirable that at least three edges of the rotating cutters are brought into contact with the poor joined portion within the cutting arc length $L_d$, as shown in FIG. 39, during the cutting of the poor joined portion.

It is necessary to cut the base plate to some degree during the cutting of the poor joined portion. If the minimum value of the actual operation is set at 0.2 mm, the condition to be satisfied by the rotating cutter is that the cuter diameter of the cutter is 500 mm and the pitch of the blade is 5 mm ($L_d=\sqrt{500\times0.2}=10$ mm, pitch P=$^{10}/_2$=5 mm).

If the pitch of the blade is below 5 mm, clogging tends to take place during a high speed rotation. Hence, it is preferable for the pitch of the blade to be 5 mm or more.

The pitch of the blade can be made larger as the diameter of the rotating cutter is made larger. It is reasonable for the rotating cutter to have a diameter of 800–900 mm, in view of an allowable value of the rotational speed determined by the condition of the circumferential speed and the equipments. Further, although rotating cutters having a diameter of 1200 mm can be manufactured, there may arise a problem in connection with acceleration and deceleration performance. For example, it may take about 5 minutes to increase the circumferential speed of the cutter upto 80 m/s.

Figure 41:
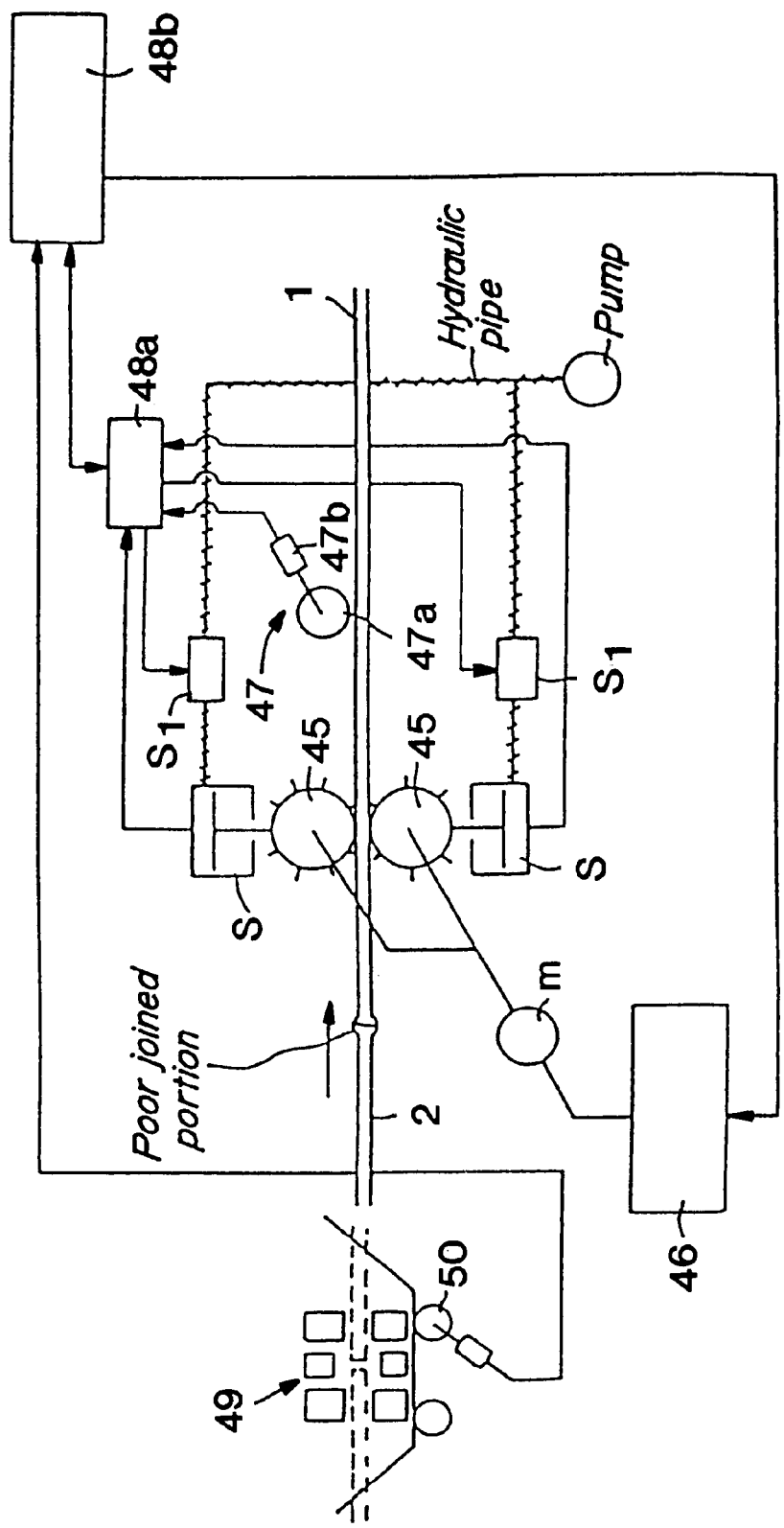
FIG. 41 is a view explaining the structure of the poor joined portion removing apparatus.

FIG. 40 and FIG. 41 show a construction of the poor joined portion removing apparatus suitable for removing the poor joined portion, such as protruding portions and burrs, formed inevitably due to the pressing upon joining the metal blocks.

Reference numeral 45 denotes a pair of upper and lower rotating cutters for cutting and removing the poor joined portion of the metal block, each having a cylinder "s" for ensuring a movement toward and away from the metal block. The rotating cutters 45 are connected to a driving motor "m" through spindles 45*a* and a distributing gear 45*b*, and driven into rotation by the driving motor "m".

Reference numeral 46 denotes a rotating speed control means for controlling a rotating speed of the rotating cutter 45, and 47 denotes a tracking means for tracking the joined portion of the metal blocks in the line direction. The tracking means 47 may comprise a contact type idle roller 47*a* which is rotated in contact with the metal block, and a rotation position detector 47*b* connected to the idle roller 47*a*. Alternatively, the tracking means 47 may comprise a contact-free type speed indicator, such as a laser Doppler system and the like.

Also, reference numeral 48*a* denotes an opening control means for controlling a cutting timing and a cutting amount of the rotating cutter 45 according to the tracking, which is interfaced with a higher rank control means 48*b* for transmitting to the control means 48*a* a signal indicating the magnitude of a gap between the upper and lower cutters based on the plate thickness information.

In the poor joined portion removing apparatus constructed as above, for removing the poor joined portion of the metal block, the tracking means 47 detects the timing when the poor joined portion reaches the rotating cutter 45. Thus, when the poor joined portion reaches an appropriate position, the cylinder "s" is actuated through a hydraulic control valve s1 by an instruction from the opening control means 48*a* so that the gap between the upper and lower cutters 45 is reduced to perform the cutting.

Incidentally, although the removing apparatus has been described as an embodiment provided with the distribution gear 45*b*, it can be omitted when the upper and lower rotating cutters 45 are driven independently.

Moreover, although the tracking of the poor joined portion of the metal block is basically performed by the tracking means 47, the tracking of an initial position of the joined portion may be carried out, for example, by a running position detector 50 disposed on the joining apparatus 49. Alternatively, the tracking may be performed by an additional instrument, for example a thermometer and the like, suitable for detecting the position of the joined portion.

Figure 42:
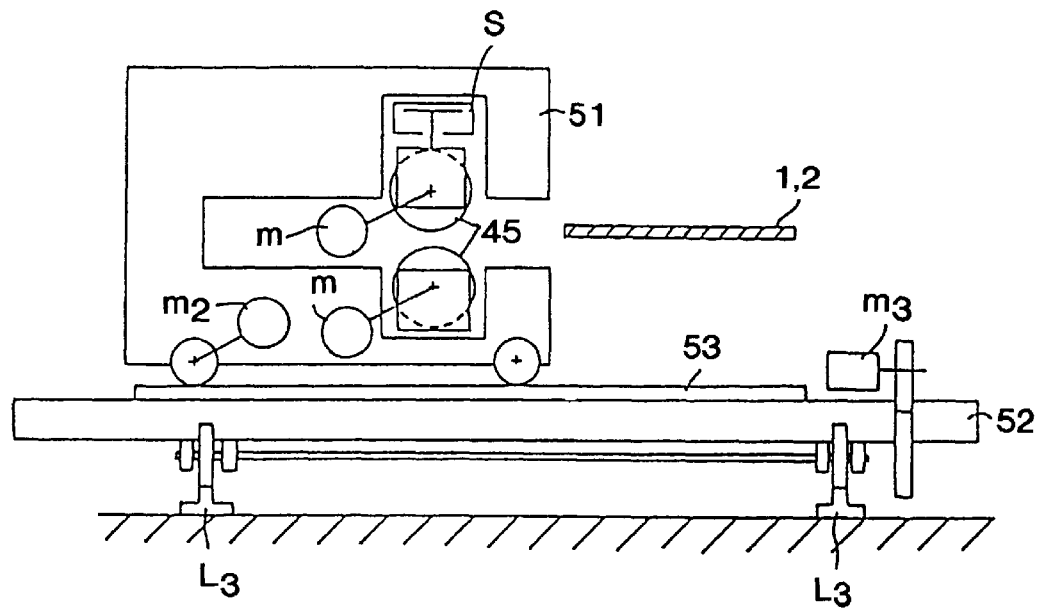
FIG. 42 is a view showing another embodiment of the poor joined portion removing apparatus.
Figure 43:
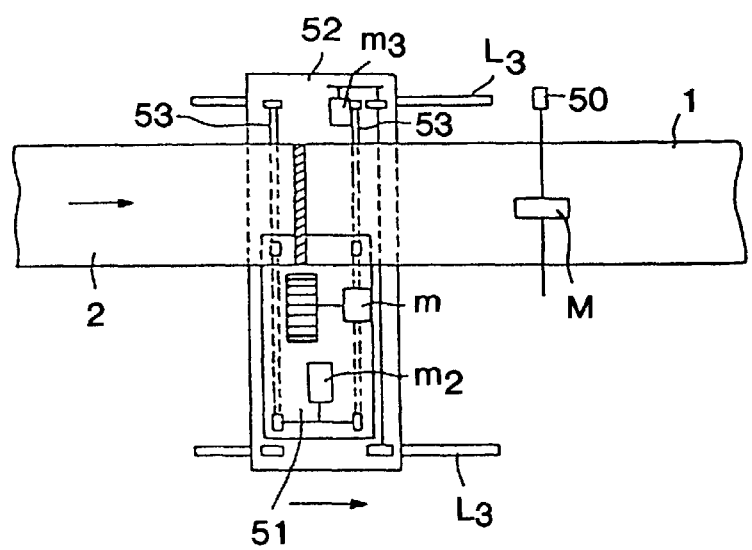
FIG. 43 is a plan view of the apparatus shown in FIG. 42.

FIG. 42 and FIG. 43 show a poor joined portion removing apparatus adapted to hold the rotating cutters 45 with narrow width, which can traverse in the widthwise direction of the metal block aboard the carriage 51 which, in turn, is movable in the longitudinal direction according to the movement of the metal block.

In this type of apparatus, since the carriage 51 and the metal blocks have to be synchronized with each other, it is necessary to provide a measuring roll "M", for example a contact type idle roller and the like, connected to the rotation position detector 50 and a running control apparatus.

The apparatus of this type is advantageous in that, since the cutter width of the rotating cutter 45 may be narrow, the driving source for driving the rotating cutter 45 can be made compact.

In addition to the motor "m" for driving the rotating cutter 45, the driving source may comprise a traverse motor $m_2$ for traversing the rotating cutter 45 in the widthwise direction of the metal block, and a motor $m_3$ for moving the carriage 51 in the longitudinal direction of the metal block.

Figure 44:
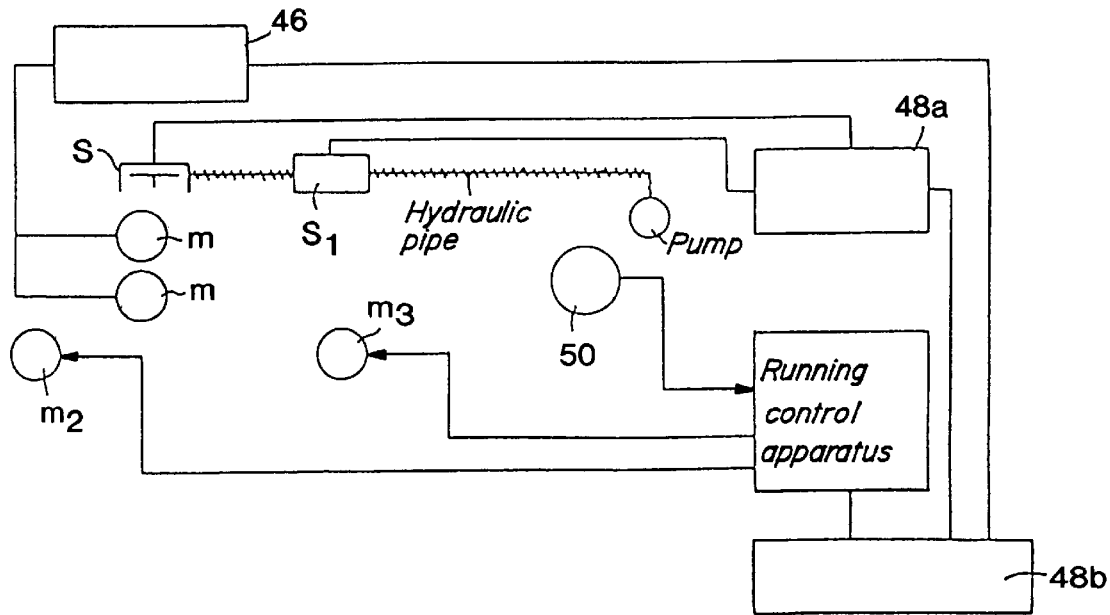
FIG. 44 is a control system diagram of the apparatus shown in FIG. 42 and FIG. 43.

FIG. 44 shows a control system diagram of a running type poor joined portion removing apparatus.

Incidentally, in FIG. 42 and FIG. 43, reference numeral 52 denotes a base frame mounting the carriage 51 thereon, which is movable in the longitudinal direction of the metal block along the rail $L_3$, and 53 denotes a rail disposed on the base frame 52 in the longitudinal direction of the metal block, along which the carriage 51 is movable.

In thus illustrated apparatus, it is not necessary to perform a dynamic control of the gap between the upper and lower rotating cutters 45 according to the tracking for the joined portion of the metal block, and all what is required is to predetermine the gap between the upper and lower rotating cutters 45, so that the adjustment of the gap can be simplified.

According to the poor joined portion removing apparatus constructed as above, the poor joined portion formed upon pressing of the metal blocks can be removed quickly prior to hot finish rolling, and the breakage of the plate in the course of rolling can be prevented.

Figure 45:
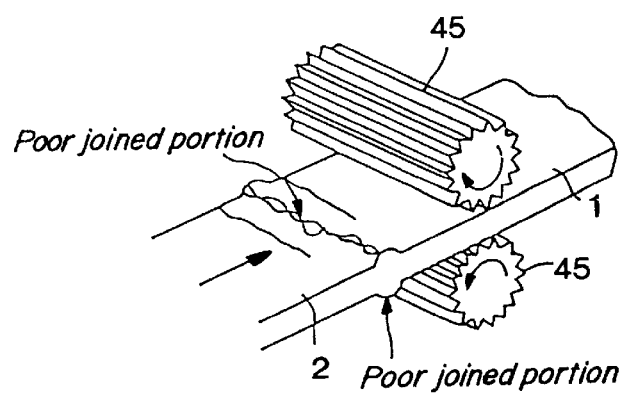
FIG. 45 is a view showing the cutting state by the poor joined portion removing apparatus shown in FIG. 40.

The cutting state by the rotating cutters 45 of the poor joined portion removing apparatus shown in FIG. 40 mentioned above will be briefly explained with reference to FIG. 45.

By using the poor joined portion removing apparatus including rotating cutters which are 950 mm in diameter and 15 mm in pitch, the cutting was carried out with a circumferential speed which is controlled at 80 m/s, and a cutting depth of 2 mm in a region including the joined portion of the metal blocks (steel blocks) and a range upto 100 mm on both sides of the joined portion. The metal blocks were then finished into a plate of 0.8–1.2 mm in thickness by a hot finish rolling. Five cycles of such joining and rolling of the metal blocks were carried out, wherein one cycle includes the joining and rolling of 20 metal blocks. As a result, there was no occurrence of breakage of the plate during the rolling.

The cooling of the poor joined portion of the metal blocks will be described hereinafter.

Since the poor joined portion formed upon pressing the metal blocks is a region which has been heated to an elevated temperature, the temperature thereof just after the joining is higher than the temperature of the base plate. When the rotating cutters are operated in order to remove the poor joined portion in such a state, cut chips may be attached onto the rotating cutters thereby causing sticking or cloggs of the cutter. Furthermore, since the strength of the joined portion is smaller than that of the base material, when a large tension is applied thereto during the conveying or rolling process of the metal blocks, the metal block may be broken at the joined portion.

Therefore, according to the invention, after the metal blocks have been joined, the joined portion is cooled before and/or after the removal of the poor joined portion.

If such cooling is performed before and/or after the removal of the poor joined portion, it becomes possible to smoothly remove the poor joined portion and improve the strength of the joined portion, thereby avoiding breakage of the plate.

As for the cooling before the removal of the poor joined portion, the cut chips can be prevented from attaching onto the rotating cutters and so on, by cooling the poor joined portion to 1,100–1,200° C. or less.

Moreover, when the temperature of the joined portion of the metal blocks is excessively decreased after the removal of the poor joined portion, the deformation resistance in rolling becomes large compared with that in the other regions so that a smooth rolling cannot be ensured, with the result that the deviation of the plate thickness becomes large. Accordingly, it is preferable to cool the joined portion at the same temperature as the base plate.

As to the cooling condition after the removal of the poor joined portion, for example, it is preferable to cool the surface of the joined portion to a temperature of about 600° C. at a cooling water amount/density of about 5000 liters/min•$m^2$ and for a cooling time of about 3 seconds.

After such cooling has been performed, the surface temperature of the metal block returns to the temperature which is substantially same with that of the base plate, by recuperation after several seconds from the finish of cooling.

Figure 46:
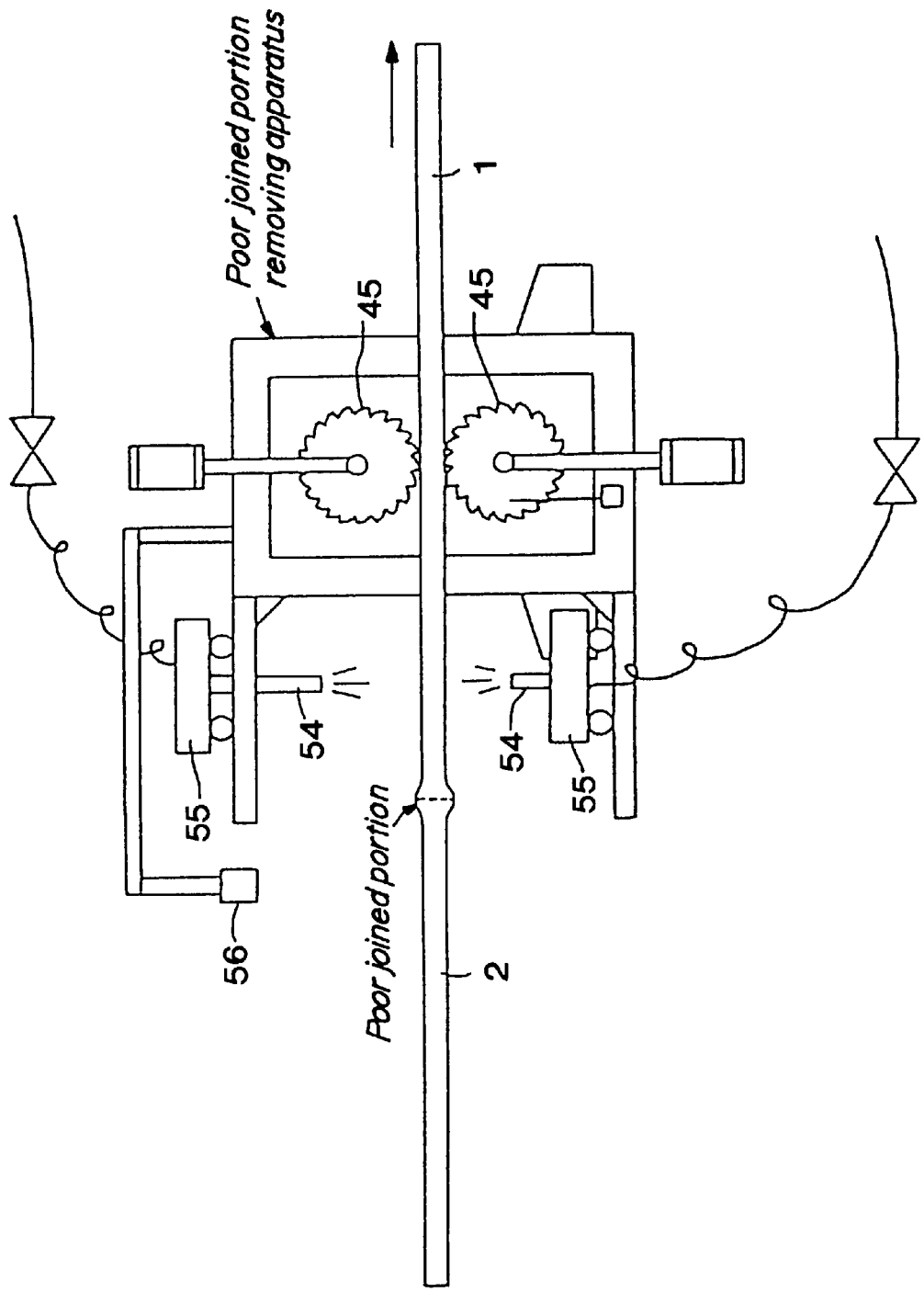
FIG. 46 is a view showing the structure of the cooling apparatus for the metal blocks.

FIG. 46 shows the construction of a cooling apparatus for the metal blocks in the continuous hot rolling. Reference numeral 54 denotes a cooling nozzle for ejecting a cooling water to the poor joined portion formed on the joined portion of the preceding metal block 1 and the succeeding metal block 2. The nozzle 54 is connected to a carriage 55 which is movable in the longitudinal direction of the metal block, so as to effectively cool the poor joined portion corresponding to the movement of the metal blocks.

Reference numeral 56 denotes a position detector for detecting the position of the poor joined portion "a".

In this embodiment, there is shown a case in which the cooling is performed only before the removal of the poor joined portion. However, a similar cooling apparatus may be arranged on the outlet side of the poor joined portion removing apparatus, to cool the joined portion of the metal block after it has been removed in the same manner as above.

Also, there is shown as an example the construction wherein the cooling nozzle 54 is connected to the carriage 55 to be moved together. However, it may be of a turning type in which the nozzle tip can be coincided with the poor joined portion corresponding to the movement of the metal blocks.

Figure 47:
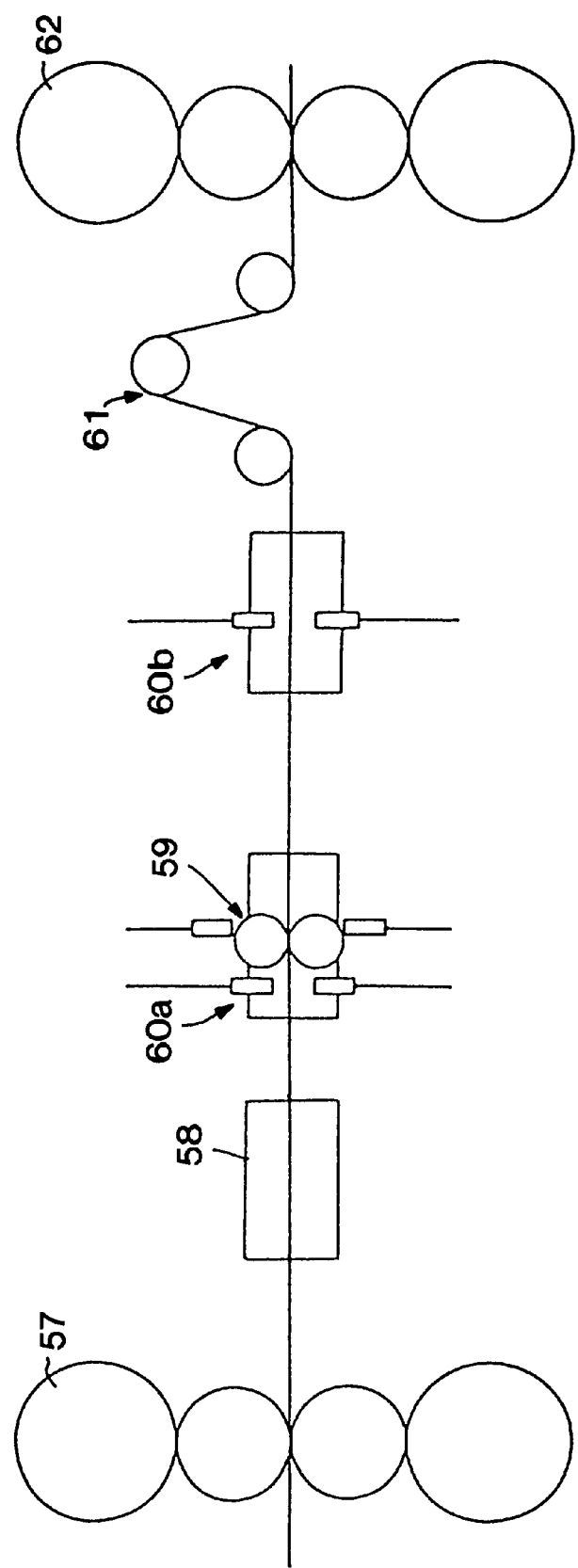
FIG. 47 is a view showing another embodiment of the cooling apparatus for the metal blocks.

FIG. 47 shows an embodiment in which the cooling apparatuses are provided on the inlet side and the outlet side of the poor joined portion removing apparatus disposed on the conveying line of the metal block. Reference numeral 57 denotes a rough rolling mill (final), 58 a joining apparatus, 59 a poor joined portion removing apparatus, 60a, 60b inlet side and outlet side cooling apparatuses, 61 a looper, and 62 a finish rolling mill.

By cooling the poor joined portion after joining the metal block or cooling the region after removal of the poor joined portion with the cooling apparatus thus constructed, the cutting operation can be performed smoothly and the breakage of the plate during the rolling can be prevented, thereby allowing a stable continuous hot rolling to be performed.

In the invention, a particularly preferable continuous hot rolling equipment includes the cutting apparatus disposed upstream of a group of the finish rolling mills for cutting at least a rear end portion of the preceding metal block and a fore end portion of the succeeding metal block, and the joining apparatus for heating and pressing both of the steel blocks thereby joining them. If necessary, there may be further provided the poor joined portion removing apparatus and/or the cooling apparatus. When the joining apparatus is of a moving type, it is particularly preferable for the metal block conveying table rollers to have a function for achieving a vertical motion.

Figure 48:
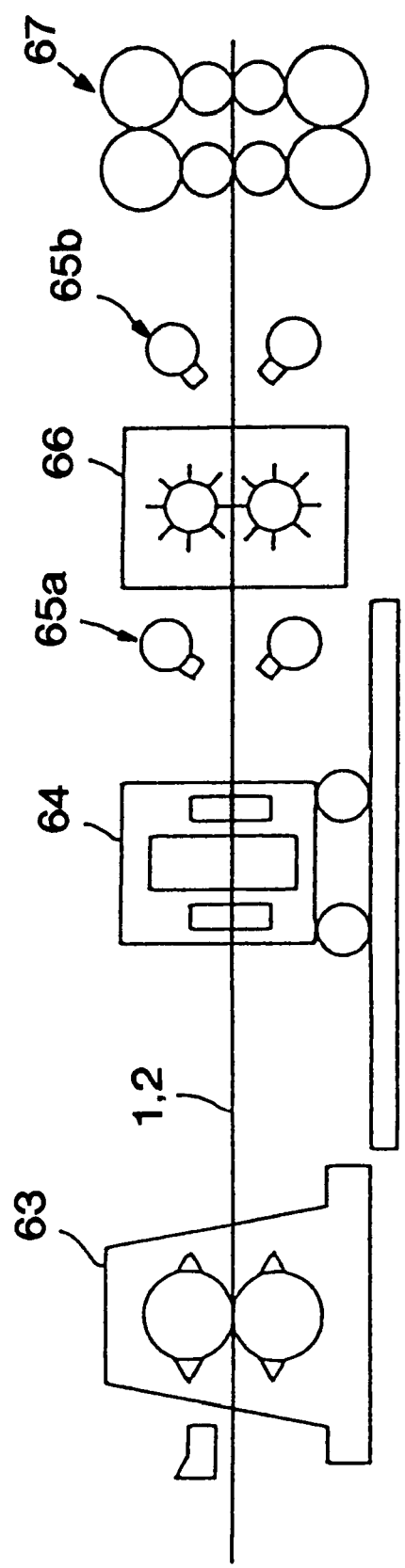
FIG. 48 is a view showing one embodiment of the continuous hot rolling equipment in which the respective apparatuses according to the invention are arranged.

An embodiment of the preferable continuous hot equipment according to the present invention is shown in FIG. 48.

In FIG. 48, reference numeral 63 denotes the cutting apparatus for cutting an end portion of the metal blocks, 64 a joining apparatus, 65a an inlet side cooling apparatus, 65b an outlet side cooling apparatus, 66 the poor joined portion removing apparatus, and 67 a group of finish rolling mills.

INDUSTRIAL APPLICABILITY

According to the invention, the following advantageous effects can be achieved.

(1) Since the deformation of the fore end portion and the rear end portion of the metal blocks upon heating and pressing can be prevented, it is possible to prevent joining of the relatively dislocated metal blocks and occurrence of buckling. Accordingly, it is possible to prevent during the rolling a breakage of the plate due to such dislocation (the first to third inventions).

Also, it is possible to achieve a proper joining by ejecting gas and water to optimize the joining condition of the metal blocks, thereby allowing a continuous hot rolling to be performed with a high productivity.

(2) The table rollers can be prevented from collision against the moving type joining apparatus without performing a complicated control relating to the vertical motion of the table rollers, so that the metal blocks can be conveyed stably (the forth invention).

(3) A smooth rolling can be performed over the entire length of the metal blocks including the connected portion (the fifth invention).

(4) The poor joined portion can be removed effectively. Further, the strength of the connected portion of the metal blocks can be increased so that the plate during transfer does not undergo a breakage even upon significant deviation in tension (the sixth invention).

(5) The end portions of the metal blocks are prevented from a vertical dislocation or buckling (the seventh to the ninth inventions). Also, the seizing portion of the clamps can be prevented from being welded or deposited to the plate, and the heating efficiency can be improved (the eighth and the ninth inventions).

(6) Not only the induction heating coil but also the clamps and the pressing means can be moved properly to the outside of the line, so that the thermal load of the entire joining apparatus can be minimized and the maintenance of the joining apparatus can be performed easily. Conventionally, the table rollers for conveying the metal blocks could not be arranged inside the carriage, so that a construction over which the metal blocks moves in a sliding manner could not be adopted. In this instance, it was impossible to prevent formation of scratches when scales are deposited. According to the invention, however, formation of scratches due to scales can be prevented, since the metal blocks can be supported by the guide rollers and the like in the carriage with the heating means, the clamps and the pressing means evacuated (the tenth invention).

(7) Since the vertical movement of the table rollers is automatically and promptly performed according to the running state of the joining apparatus, it is possible to avoid an accident wherein the joining apparatus collides against the table rollers. Also, it is possible to avoid a situation wherein the metal blocks cannot be supported due to a slow upward motion of the table rollers after the passage of the joining apparatus. Further, since the table roller device is of a balance type, the table rollers can be moved vertically by allowing the hydraulic oil of the cylinders for supporting the table rollers to flow just from one to another in accordance with the movement of the joining apparatus. To this end, it is only necessary to pressurize the inside of the hydraulic circuit at a constant pressure and a complicated control is not required to operate the hydraulic apparatus for vertically moving the table rollers, making it possible to minimize the power consumption. Furthermore, the table rollers on both sides can be held at the same level even when the guide rollers do not contact with the guide rail, so that the metal blocks can be positively supported and conveyed (the eleventh invention).

(8) The sticking and clogging of the cutter can be mitigated, so that it is possible to extend the life time of the cutter. The poor joined portion of the metal blocks can be removed promptly prior to the finishing hot rolling, so that breakage of the plate in rolling caused by the poor joined portion can be prevented. (the twelve invention).

(9) The temperature of the poor joined portion of the metal blocks can be made substantially same as that of the base plate, making it possible to prevent breakage of the base plate in rolling caused by the deviation of tension and improve the accuracy of the plate thickness. Also, the cut chips do not stick to the rotating cutters during removal of the poor joined portion, so that a stable cutting operation can be performed for a long time (the thirteenth invention).

We claim:

1. In a continuous hot rolling method wherein a rear end portion of a preceding metal block and a fore end portion of a succeeding metal block are respectively, cut, heated and then pressed together to join the blocks to each other, a portion of said joined blocks having a defect in said joint and subsequently having a finish rolling performed on the joined blocks, the method comprising the step of:

shaving the defectively joined portion of said joined blocks to a predetermined depth below a surface of said blocks after said blocks are formed by pressing.

2. The method according to claim 1, wherein the defectively joined portion is removed by a rotating cutter at a circumferential speed of 50–120 m/s.

3. An apparatus for removing a defective portion of a pair of joined metal blocks previously pressed together in a continuous hot pressing process, said apparatus comprising:

a pair of upper and lower rotating cutters for shaving and removing the defectively joined portions of the metal blocks;

rotating speed control means for controlling the rotating cutters at a circumferential speed of 50–120 m/s;

means for tracking a joined portion of the metal blocks; and control means for controlling the cutting by the rotating cutter according to a tracked state of the metal blocks.

* * * * *

UNITED STATES PATENT AND TRADEMARK OFFICE
CERTIFICATE OF CORRECTION

PATENT NO. : 6,037,575
DATED : March 14, 2000
INVENTOR(S) : Isoyama, Shigeru, et al It is certified that error appears in the above-identified patent and that said Letters Patent is hereby corrected as shown below:

Title page,
Assignee, change "Kawasaki Steel Corporation Chiba Works, Chiba;" to -- Kawasaki Steel Corporation, Hyogo; --
Assignee, change "Mitsubishi Jukogyo Kabushiki Kaisha Hiroshima Machinery Works, Hiroshima" to -- Mitsubishi Jukogyo Kabushiki Kaisha, Tokyo, --

After "Division of application No. 08/387,788, Feb. 15, 1995, Pat. No. 5,753,894" insert:

Item [30],
-- FOREIGN APPLICATION PRIORITY:
June 15, 1994   PCT        PCT/JP94/00968
June 15, 1993   JAPAN      5-167,362
June 17, 1993   JAPAN      5-169,850
Nov. 4, 1993    JAPAN      5-275,515

Signed and Sealed this

Second Day of October, 2001

Attest:

NICHOLAS P. GODICI
Attesting Officer    Acting Director of the United States Patent and Trademark Office